(12) United States Patent
Koenig et al.

(10) Patent No.: US 8,851,409 B2
(45) Date of Patent: Oct. 7, 2014

(54) SYSTEM FOR CRUSHING

(76) Inventors: Mark E. Koenig, Pickerington, OH (US); Larry E. Koenig, Canal Winchester, OH (US)

( * ) Notice: Subject to any disclaimer, the term of this patent is extended or adjusted under 35 U.S.C. 154(b) by 0 days.

(21) Appl. No.: 13/278,273

(22) Filed: Oct. 21, 2011

(65) Prior Publication Data

US 2012/0145814 A1 Jun. 14, 2012

Related U.S. Application Data

(63) Continuation-in-part of application No. 13/007,864, filed on Jan. 17, 2011.

(60) Provisional application No. 61/421,505, filed on Dec. 9, 2010.

(51) Int. Cl.
 *B02C 19/22* (2006.01)
 *B30B 9/30* (2006.01)
 *B29B 17/00* (2006.01)
 *B30B 9/32* (2006.01)

(52) U.S. Cl.
 CPC .............. *B30B 9/3007* (2013.01); *B30B 9/3082* (2013.01); *B30B 9/3039* (2013.01); *B29B 17/0052* (2013.01); *B30B 9/321* (2013.01); *B30B 9/3089* (2013.01)
 USPC ...................... 241/260.1; 241/285.3; 100/117; 100/145

(58) Field of Classification Search
 USPC .......... 100/112, 117, 145–150; 292/194, 195, 292/204, 256, 256.69, 256.71, 256.73, 292/256.75; 241/203, 260, 260.1
 See application file for complete search history.

(56) References Cited

U.S. PATENT DOCUMENTS

| 728,516 | A | | 5/1903 | Trabue |
|---|---|---|---|---|
| 829,315 | A | * | 8/1906 | Anderson ...................... 100/145 |
| 1,221,054 | A | | 4/1917 | Hyatt |
| 1,354,528 | A | * | 10/1920 | Wertenbruch .................. 100/74 |
| 1,506,036 | A | | 8/1924 | Willmarth |
| 2,171,065 | A | * | 8/1939 | Johnson ........................ 292/278 |
| 2,470,278 | A | | 5/1949 | West |
| 2,576,784 | A | | 11/1951 | Galen |
| 2,615,387 | A | | 10/1952 | Messing |

(Continued)

OTHER PUBLICATIONS

FKC Co., Ltd., Biosolids Dewatering, sales literature, 2 pages, found at www.fkcscrewpress.com, copyrighted 2009.

(Continued)

*Primary Examiner* — Shelley Self
*Assistant Examiner* — Leonel Vasquez
(74) *Attorney, Agent, or Firm* — Standley Law Group LLP

(57) ABSTRACT

A system for crushing material that may include a compaction chamber and a screw assembly that generally extends between the proximal and distal ends of the compaction chamber. In one embodiment, a portion of the screw assembly increases in diameter along a length of the shaft of the screw assembly such that the system is configured to crush material between the compaction chamber and the portion that increases in diameter. The portion that increases in diameter may be integral with the shaft of the screw assembly. An embodiment of the system may also include at least one wear member that is removably associated with the distal portion of the compaction chamber such that the wear member may assist with crushing. Further embodiments may include improved input, discharge, and/or jam clearance means for a screw crusher or other types of screw or auger systems.

21 Claims, 22 Drawing Sheets

(56) References Cited

U.S. PATENT DOCUMENTS

| | | | |
|---|---|---|---|
| 2,709,956 A * | 6/1955 | Napier | 100/72 |
| 2,823,603 A | 2/1958 | Collins | |
| 2,902,922 A | 9/1959 | Williams | |
| 2,982,201 A | 5/1961 | Raymond | |
| 3,021,162 A * | 2/1962 | Jahn | 292/66 |
| 3,135,193 A * | 6/1964 | Hunt | 100/117 |
| 3,179,040 A | 4/1965 | Seltzer | |
| 3,787,830 A | 1/1974 | Cato | |
| 3,866,529 A | 2/1975 | Holman | |
| 3,877,365 A | 4/1975 | Berggren | |
| 3,938,434 A | 2/1976 | Cox | |
| 3,982,483 A | 9/1976 | Bird et al. | |
| 4,037,528 A | 7/1977 | White | |
| 4,117,776 A * | 10/1978 | Hunt | 100/117 |
| 4,212,239 A * | 7/1980 | Fraula et al. | 100/37 |
| 4,256,035 A | 3/1981 | Neufeldt | |
| 4,289,067 A | 9/1981 | Hanak | |
| 4,323,007 A | 4/1982 | Hunt et al. | |
| 4,355,905 A | 10/1982 | St. Louis et al. | |
| 4,358,995 A * | 11/1982 | Ballo et al. | 100/98 R |
| 4,516,489 A * | 5/1985 | Ballo | 100/98 R |
| 4,516,492 A | 5/1985 | Olfert | |
| 4,636,127 A | 1/1987 | Olano et al. | |
| 4,709,628 A | 12/1987 | Glowacki | |
| 4,770,236 A | 9/1988 | Kulikowski | |
| 4,807,816 A | 2/1989 | Ataka | |
| 4,852,817 A * | 8/1989 | Tipton | 241/260.1 |
| 4,897,194 A | 1/1990 | Olson | |
| 4,951,884 A | 8/1990 | Koenig | |
| 5,108,040 A | 4/1992 | Koenig | |
| 5,114,331 A | 5/1992 | Umehara et al. | |
| 5,180,225 A | 1/1993 | Piccolo, Sr. et al. | |
| 5,195,429 A * | 3/1993 | Firpo | 100/96 |
| 5,308,003 A | 5/1994 | Koenig | |
| 5,373,923 A | 12/1994 | Koenig | |
| 5,383,397 A | 1/1995 | Battles | |
| 5,601,239 A | 2/1997 | Smith | |
| 5,611,268 A | 3/1997 | Hamilton | |
| 5,662,035 A | 9/1997 | Lee | |
| 5,735,199 A | 4/1998 | Esau | |
| 5,819,643 A | 10/1998 | Mcilwain | |
| RE36,023 E | 1/1999 | Koenig | |
| 5,857,406 A * | 1/1999 | Scheucher et al. | 100/112 |
| 6,247,662 B1 | 6/2001 | Hamilton | |
| 6,505,550 B2 | 1/2003 | Hamilton | |
| 6,615,710 B1 * | 9/2003 | Ishigaki et al. | 100/111 |
| 6,945,487 B1 | 9/2005 | Obitz | |
| 7,226,092 B2 * | 6/2007 | Anzai | 292/247 |
| 7,226,213 B2 | 6/2007 | Kraft | |
| 7,360,639 B2 | 4/2008 | Sprouse et al. | |
| 7,523,996 B1 | 4/2009 | Darst | |
| 7,631,596 B2 * | 12/2009 | Williams et al. | 100/149 |
| 7,740,325 B1 | 6/2010 | Chen | |
| 7,828,482 B2 | 11/2010 | Beausoleil et al. | |
| 7,851,585 B2 | 12/2010 | Brison et al. | |
| 8,033,733 B2 | 10/2011 | Lang | |
| 2005/0069446 A1 | 3/2005 | Kriehn | |
| 2005/0189287 A1 * | 9/2005 | Lin et al. | 210/415 |
| 2006/0219831 A1 * | 10/2006 | Yamamoto | 241/260.1 |
| 2008/0121497 A1 | 5/2008 | Esterson et al. | |
| 2010/0266230 A1 | 10/2010 | Hong | |

OTHER PUBLICATIONS

RUNI Danish Engineering, SK240, sales literature, 1 page, found at www.runi.dk, copyrighted 2009.

RUNI Danish Engineering, Screw Compactor, product information, 2 pages, found at www.compactor-runi.com, Apr. 19, 2011.

PolyMax, Polystyrene Foam Densifier, product information, 1 page, found at www.polyman5000.com, copyrighted 2006.

Intcorecycling.com, GreenMax Recycling Machine, product information, 1 page, found at www.intcorecycling.com, copyrighted 2009-2010.

Foam Equipment + Consulting Co., Heger Recycling Equipment, sales literature, 3 pages, found at www.foamequipment.com/heger.com, copyrighted 2011.

RecycleTech Corp., RecycleTech—The Environment Savers, company information, 1 page, found at www.recycletechno.com, copyrighted 2009.

Intcorecycling.com, GreenMax Recycling Machine, product information, 2 pages, found at www.intcorecycling.com, copyrighted 2009-2010.

Sebright Products, Inc., Bright Technologies—Innovators in Dewatering Equipment Technologies, product information, 2 pages, found at www.brightbeltpress.com, copyrighted 2006.

* cited by examiner

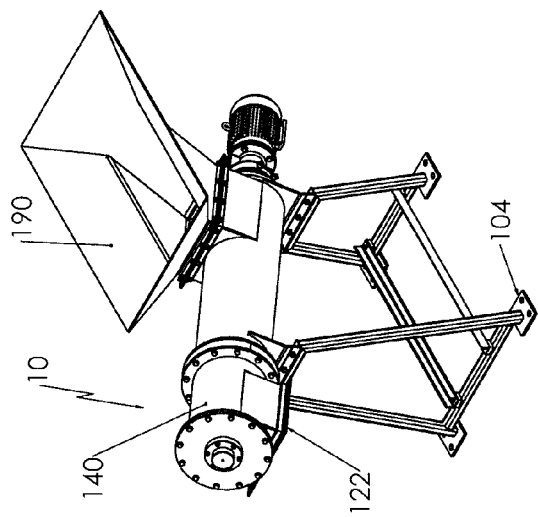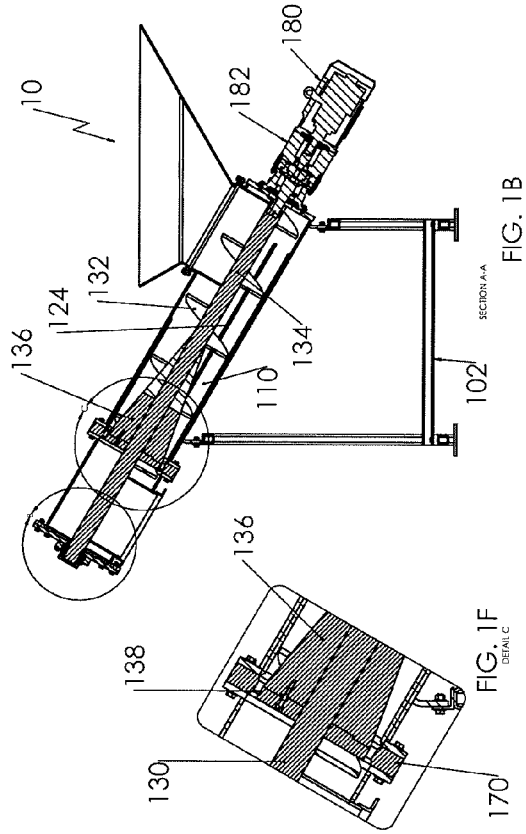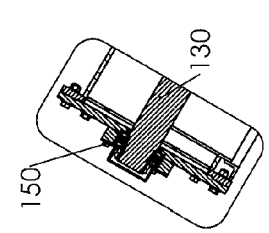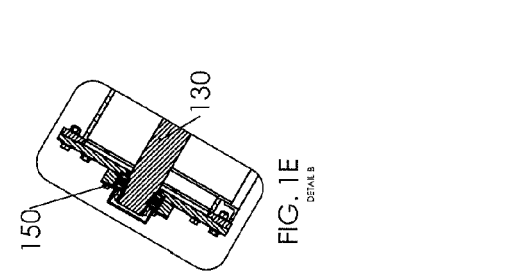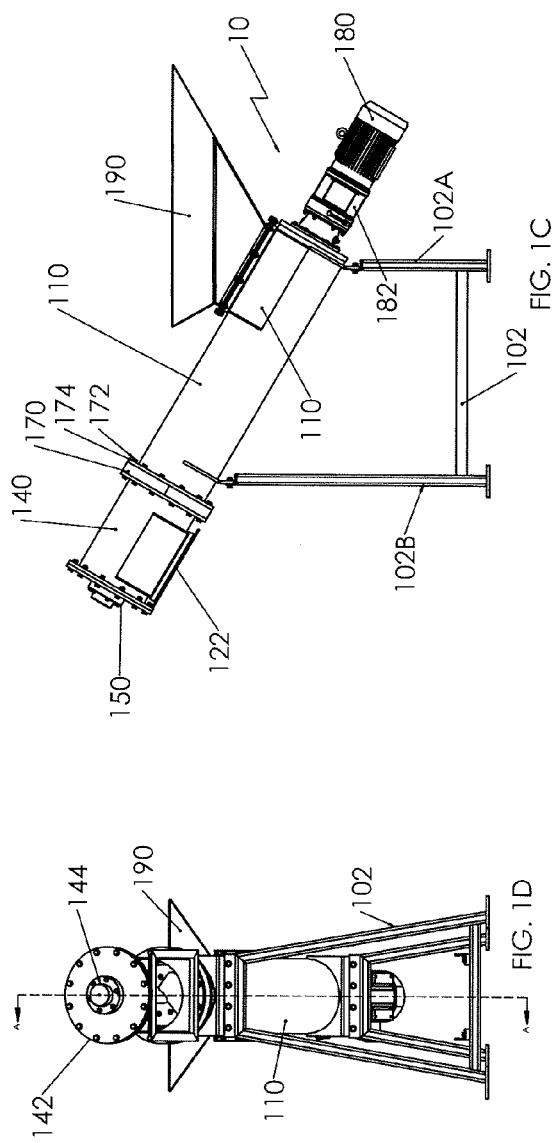

SECTION D-D

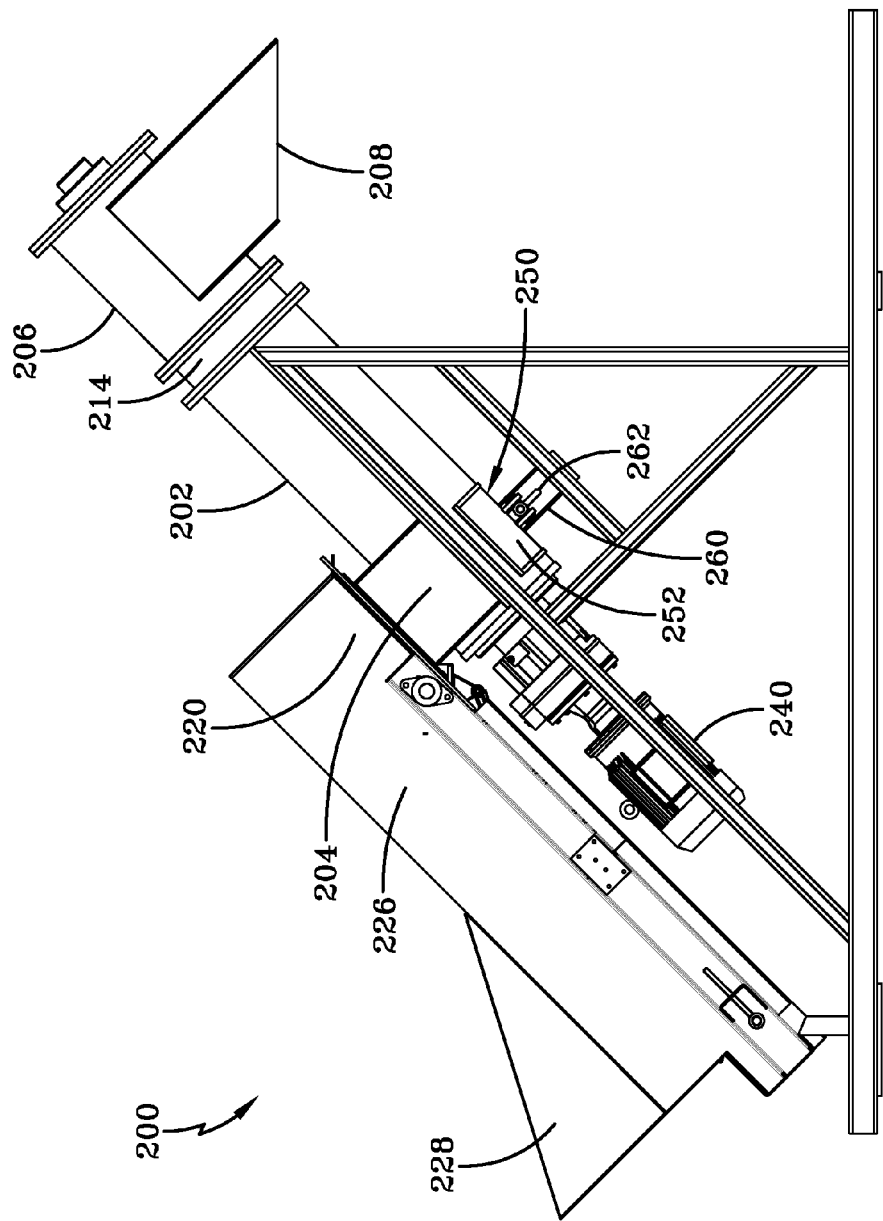

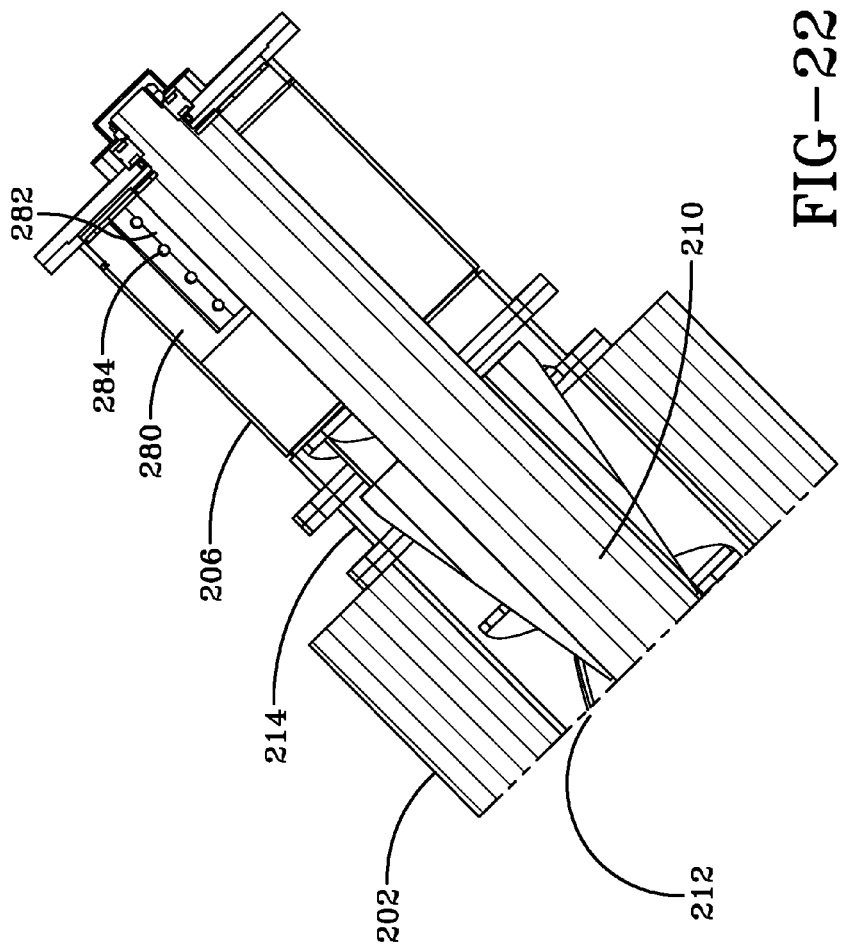

SYSTEM FOR CRUSHING

CROSS-REFERENCE TO RELATED APPLICATIONS

This application is a continuation-in-part of U.S. patent application Ser. No. 13/007,864, filed Jan. 17, 2011, which claims the benefit of U.S. Provisional Application No. 61/421,505, filed Dec. 9, 2010, each of which is hereby incorporated by reference as if fully recited herein.

BACKGROUND AND SUMMARY OF THE INVENTION

Exemplary embodiments of the invention may be related to a crusher. A crusher may also be known as a compactor. For example, embodiments may include a crusher that may have an inverse tapered shaft (i.e., reverse tapered shaft) that may utilize a smaller amount of energy than known crushers. A further exemplary embodiment may relate to a crusher that includes components that may be more easily replaced than conventional screw crushers to reduce long-term cost of the crusher during use thereof. Also, an exemplary embodiment of a screw crusher may facilitate the movement of compacted or compressed material better than known crushers. Further exemplary embodiments of the invention may include improved input means, discharge means, and/or jam clearance means for a screw crusher. Other exemplary embodiments include improved input means, discharge means, and/or jam clearance means for other types of screw or auger systems not limited to crushers.

The amount of materials ending up in landfills is continuously increasing. As the scarcity of landfill space increases, along with more stringent environmental regulations, there have been increased efforts to reduce the amount of waste produced by individuals, in addition to an increased effort to recycle materials. Many different processes and machines have been developed to facilitate combating this ever-increasing problem.

One of the major contributing materials to landfill overflow are plastics. Many plastics take a very long period of time to biodegrade, if they biodegrade. These types of plastics may also be resistant to photolysis. Furthermore, certain types of lightweight plastics may not only float on water, but may also blow in the wind, causing an abundant amount of litter, especially along shores and waterways.

Additionally, in certain manufacturing settings when plastic products, for example, plastic beverage bottles, do not meet desired characteristics and/or tolerances, the filled or unfilled beverage bottles or containers may need to be recycled. In some scenarios, the liquid containers may already have been at least partially filled with liquid before a device recycles the container. There is a need to deliquify such filled containers in order to facilitate recycling.

To combat the littering problem that comes with the use of plastics, different machines and methods of recycling have been developed. Different machines and methods have been developed to facilitate compaction and/or compression of plastics and other materials that may be recycled. In association with recycling, compaction may facilitate the reduction of pentane gas dangers. Also, the compaction process may reduce storage requirements and reduce hauling and/or handling costs.

Known crushers may not adequately address the aforementioned needs. A primary shortcoming of known crushers is the failure to crush all of the material fed to it. For example, when crushing containers, known crushers commonly allow a certain number of containers to pass through the system without being crushed. This is particularly problematic with filled containers. Among other things, this can lead to increased recycling time and costs. For example, uncrushed containers may necessitate increased time in a baling machine in order to crush the previously uncrushed containers.

Additionally, known crushers that are used to crush or compact plastics are typically engineered to crush or compact one specific type of material and/or product. In an example, a known crusher may be engineered to crush 12 oz. aluminum beverage cans. To facilitate the compaction or crushing of other materials or products, the known crusher or compactor must be refabricated. The requirement of specific crushers for each different material and/or product leads to added overhead costs to companies that wish to crush or compact multiple different materials and/or products using a singular machine. In one example, it may be preferred that a single machine may crush or compact both a beverage can and produce.

Furthermore, known crushers are not self-cleaning when in use. For example, known crushers commonly become clogged with scraps of various sorts (e.g., labels or other parts of the material being processed) after a period of use. The material can accumulate and eventually hinder or prevent further use of known crushers. Known crushers typically require that an individual disassemble the machine to clean the machine of a crushed material before a second material may be crushed. In one example, for a known crusher to first crush produce and then crush plastic bottles, the known crusher would have to be disassembled after crushing the produce before the plastic bottles could be crushed. This adds both time and cost to crushing multiple types of different materials.

There are currently three different types of compaction methods that may be used to compact plastics and other materials: heat extrusion, ram compaction, and screw compaction using an auger or compactor/compression screw. The known screw crushers and related methods are less than ideal for compressing or compacting materials. One of the main problems that occur during the compaction process is that the mechanical components used to contact the plastic throughout the screw compaction process may wear due to high friction, creating undesirable tolerances between components of the crusher. This is especially true when known screw crushers continuously run for extended periods of time, or in situations where there is high friction within the screw crusher. The high friction may also demand higher power input to the crusher. For instance, a high horsepower motor may be needed to prevent shutdown due to the high friction and continue to advance the compressed material out of the crusher.

Crushers that use screw compaction have an especially inherent problem with wear of components due to the friction within the chamber and other areas. This occurs when there is a substantial coefficient of friction between the material and typically a surface within the chamber of the compression screw. The friction between the material and a portion of the chamber may lead to undesirable tolerances between components of the crusher. As such, an apparatus and method of replacing or modifying the component or components that wear due to friction and other sources is desired. Ceasing the continuous operation of the crusher may add extra time and cost to the recycling process. Additionally, in some instances, total compaction of a product may not therefore be desired due to higher energy requirements or increased wear on the equipment. In some of those circumstances, a crusher is desired that withstands the compaction or compression of materials but utilizes a smaller amount of energy than known crushers.

Further drawbacks may be associated with known crushers. Such crushers may be configured such that the material to be crushed may be introduced in a non-uniform manner. For instance, an input load may be introduced that overwhelms the capacity of the crusher, which may prevent or impede operation of the crusher. In addition, an inconsistent input may be inefficient. Moreover, it may be detrimental to the operation of a crusher to input different types of material in the same manner. As a result, known input means may not be conducive to switching from crushing one type of material to another type of material. In addition, known crushers may be prone to jamming, which as previously mentioned may be difficult, time-consuming, and costly to clear.

Given the problems that exist with known screw crushers, there is need for a crusher that crushes 100% of the material fed to it (e.g., 100% crushing or flattening of containers). A crusher that incorporates components that minimize the cost associated with use is also desired. Furthermore, providing a crusher that provides an efficient means to replace worn components on the chamber or other mechanical components is also desirable. Furthermore, it is desired that the crusher may run on a substantially continuous basis by minimizing or eliminating a buildup of solid material mass that could stop or slow down the crusher. It may be desired to provide a crusher that utilizes a smaller amount of energy than known crushers. An exemplary crusher may also be desired that may remove liquids from containers. An exemplary crusher may be desired that reduces overhead costs to companies that wish to crush or compact multiple different materials and/or products (e.g., plastic bottles, metal cans, foods, other wastes, etc.) using a solitary crusher that does not need any component changed or replaced. Additionally, exemplary embodiments of crushers may allow multiple different materials to be crushed without the need to disassemble the crusher. Further exemplary embodiments of a crusher may also be desired. For instance, there is a need for an improved input means to facilitate the introduction of different types of material to be crushed. A need also exists for a crusher having improved means to prevent or limit jams and/or to allow for the clearance of jams. Similar needs may exist for other types of screw or auger systems. An exemplary embodiment of a crusher or other screw or auger system of the present invention may satisfy some or all of these needs or preferences.

Although this application may talk about a crusher that employs the method of screw compaction to compress plastics and other materials, the crusher may be used in other applications other than compaction processes.

Exemplary embodiments of the crusher may crush 100% of the material that is fed to it (e.g., 100% flattening of containers). By crushing or flattening all of the material that is fed to it, the inventors have found that exemplary embodiments of a crusher may reduce the typical baling cost and operational time by up to approximately 70%. The reduced volume may also reduce transportation costs. For instance, one exemplary embodiment may reduce PET bottle volume by about 66%. Nonetheless, other results are possible.

Exemplary embodiments of a crusher may also include replaceable components that are subject to increased wear during use of the crusher. An example of the crusher may include an efficient means to replace worn components on or in the chamber, in addition to other mechanical components. Also, some exemplary embodiments may provide simplicity of operation with only essentially one moving part (e.g., a screw assembly).

Exemplary embodiments of the crusher may allow for substantially continuous use by minimizing or eliminating a buildup of solid material mass that could slow or stop the crusher. For instance, some exemplary embodiments may essentially be self-cleaning.

Exemplary embodiments may include an improved input mechanism and method. An example of the input means may help to regulate the input feed. Improved regulation of the input may allow for ease of switching between crushing one type of material to another type of material. An example of the input means may also help to prevent or limit jams. Exemplary embodiments may also include other features to prevent of limit jams. For example, an embodiment of a crusher may allow for improved access to potential jams such that the crusher does not have to be disassembled to address the problem. An exemplary embodiment may also allow for improved discharge of crushed material, thereby preventing or limiting jamming at the output.

Exemplary embodiments are directed to a crusher and related methods. Certain embodiments of the crushers may be of multiple geometries and sizes that are used to compress or compact different materials. Unless expressly set forth, it is not intended to limit the invention to compacting particular materials. Moreover, some exemplary embodiments may also include other types of screw and auger systems that may benefit from similar features and advantages as described herein.

In addition to the novel features and advantages mentioned above, other benefits will be readily apparent from the following descriptions of the drawings and exemplary embodiments.

BRIEF DESCRIPTION OF THE DRAWINGS

FIGS. 1A-1F are views of an exemplary embodiment of a crusher.

FIG. 13 is a side elevation view of another exemplary embodiment of a crusher with a jam release door in a closed position.

FIG. 22 is a partial cross-sectional view of the crusher of FIG. 13.

DETAILED DESCRIPTION OF EXEMPLARY EMBODIMENT(S)

As seen in FIGS. 1-11, exemplary embodiments of a crusher 10 that may be adapted to compact plastics or other materials are illustrated. Exemplary embodiments may include a frame 102 with a proximal end 102A and a distal end 102B such that mounting bodies 104 are attached to the frame 102. In other exemplary embodiments, the frame 102 may be adapted to move on different surfaces with the inclusion of wheels or other devices that would facilitate movement thereof.

Figure 2A:
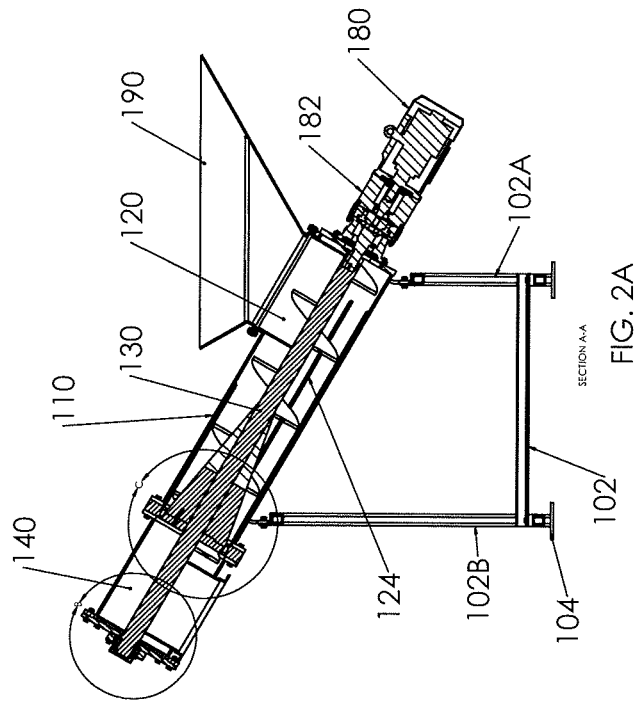
FIGS. 2A-2C are views of an exemplary embodiment of a crusher.
Figure 2B:
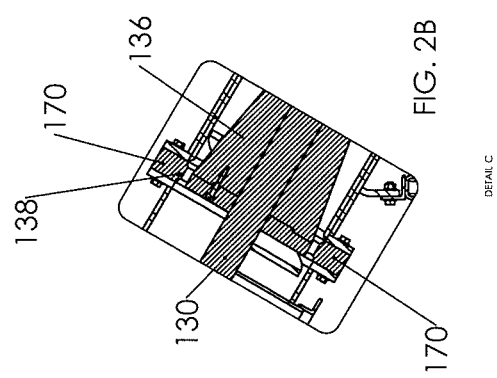
Figure 2C:
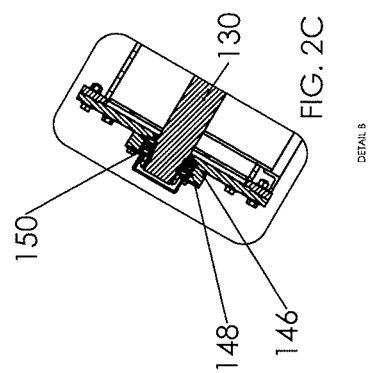
Figure 3A:
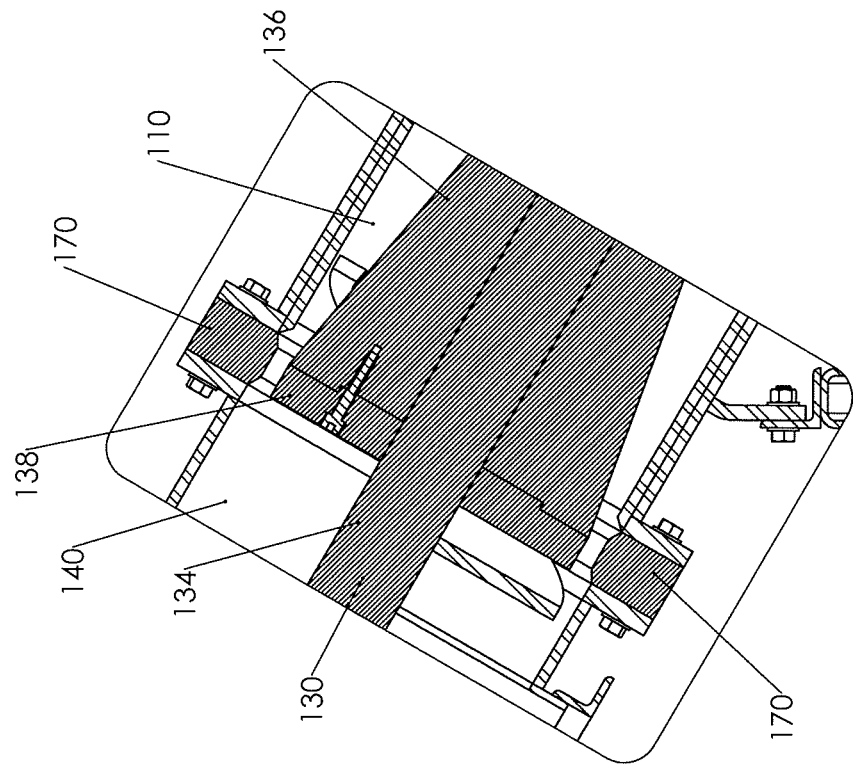
FIGS. 3A-3B are views of an exemplary embodiment of a crusher.
Figure 3B:
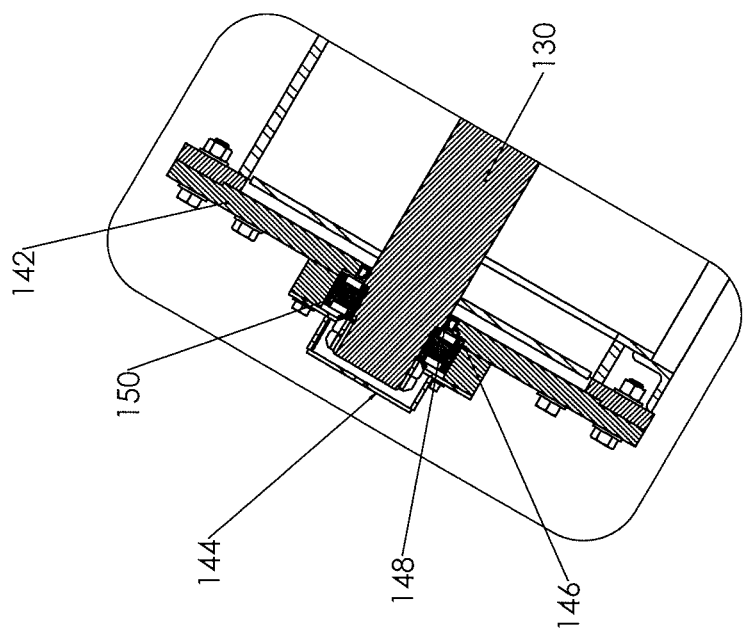
Figure 4:
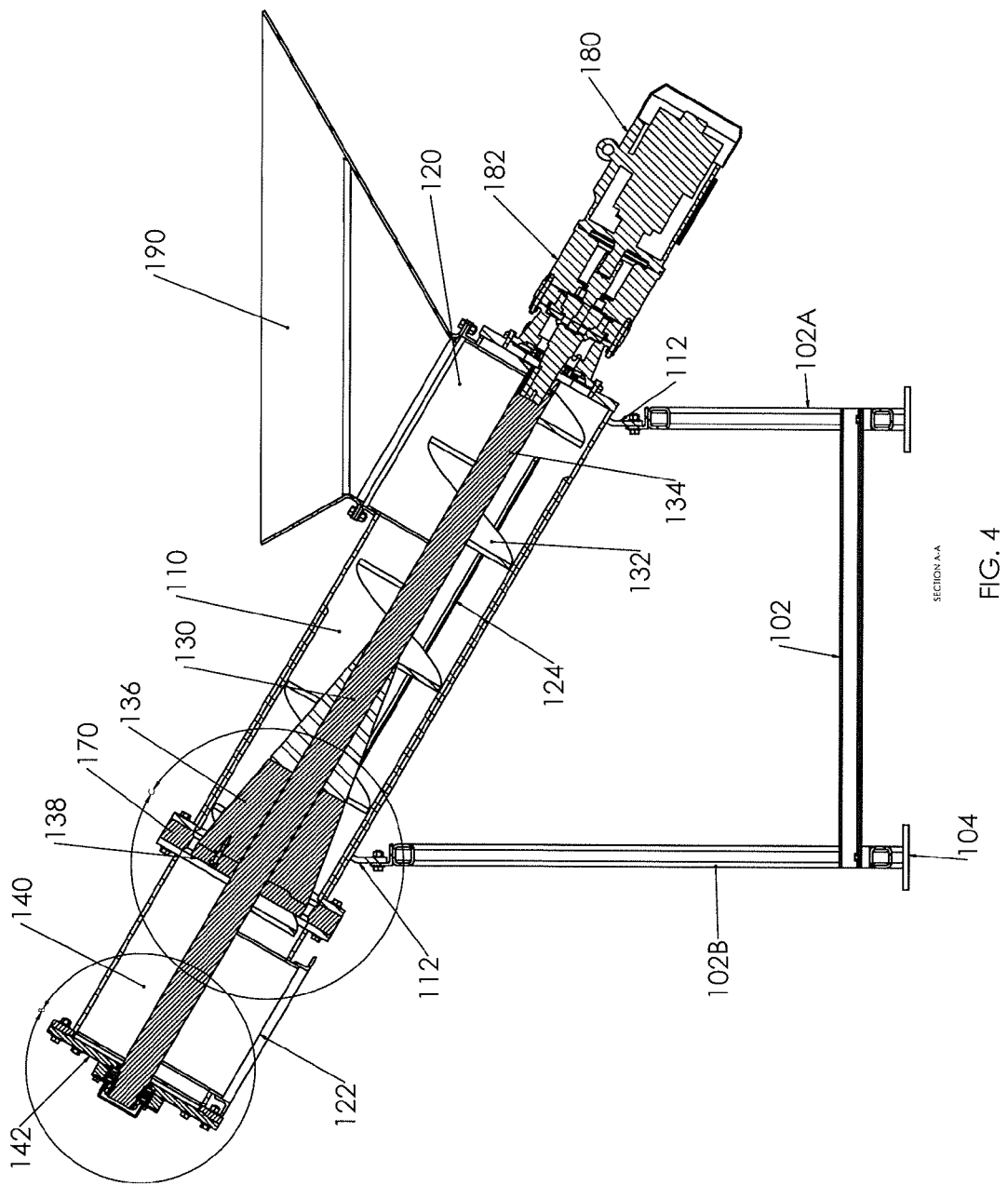
FIG. 4 is a cross-sectional view of an exemplary embodiment of a crusher.
Figure 5:
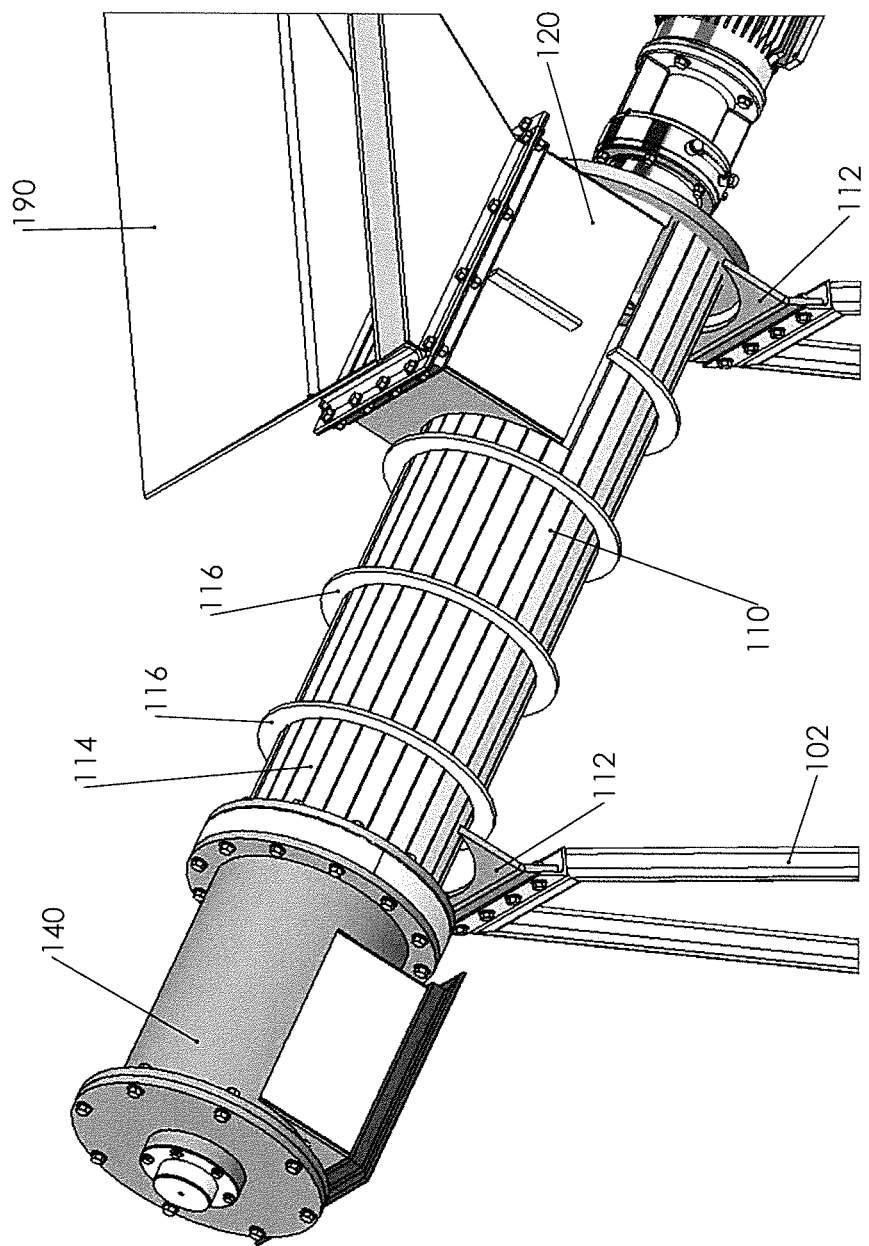
FIG. 5 is a perspective view of an exemplary embodiment of a crusher.
Figure 6:
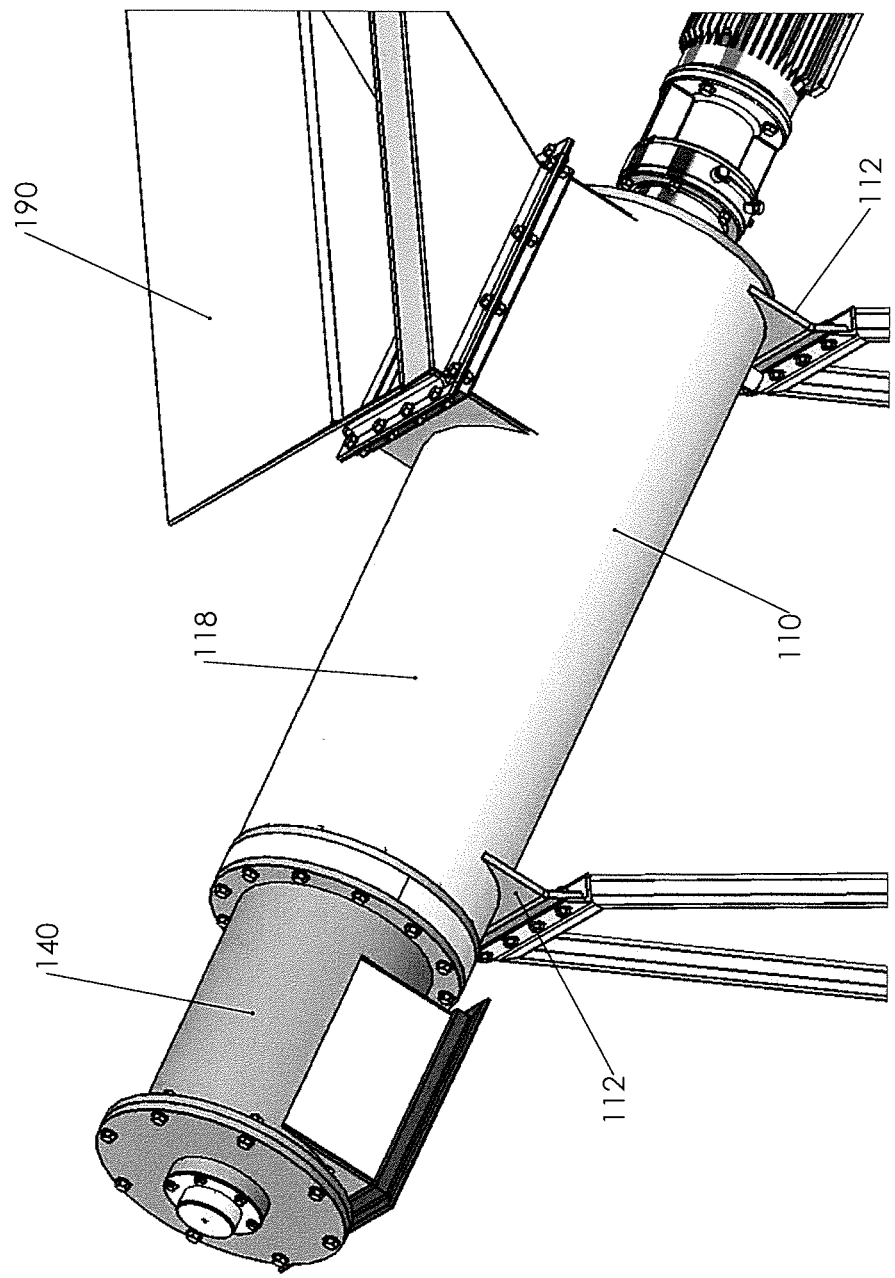
FIG. 6 is a perspective view of an exemplary embodiment of a crusher.
Figure 7:
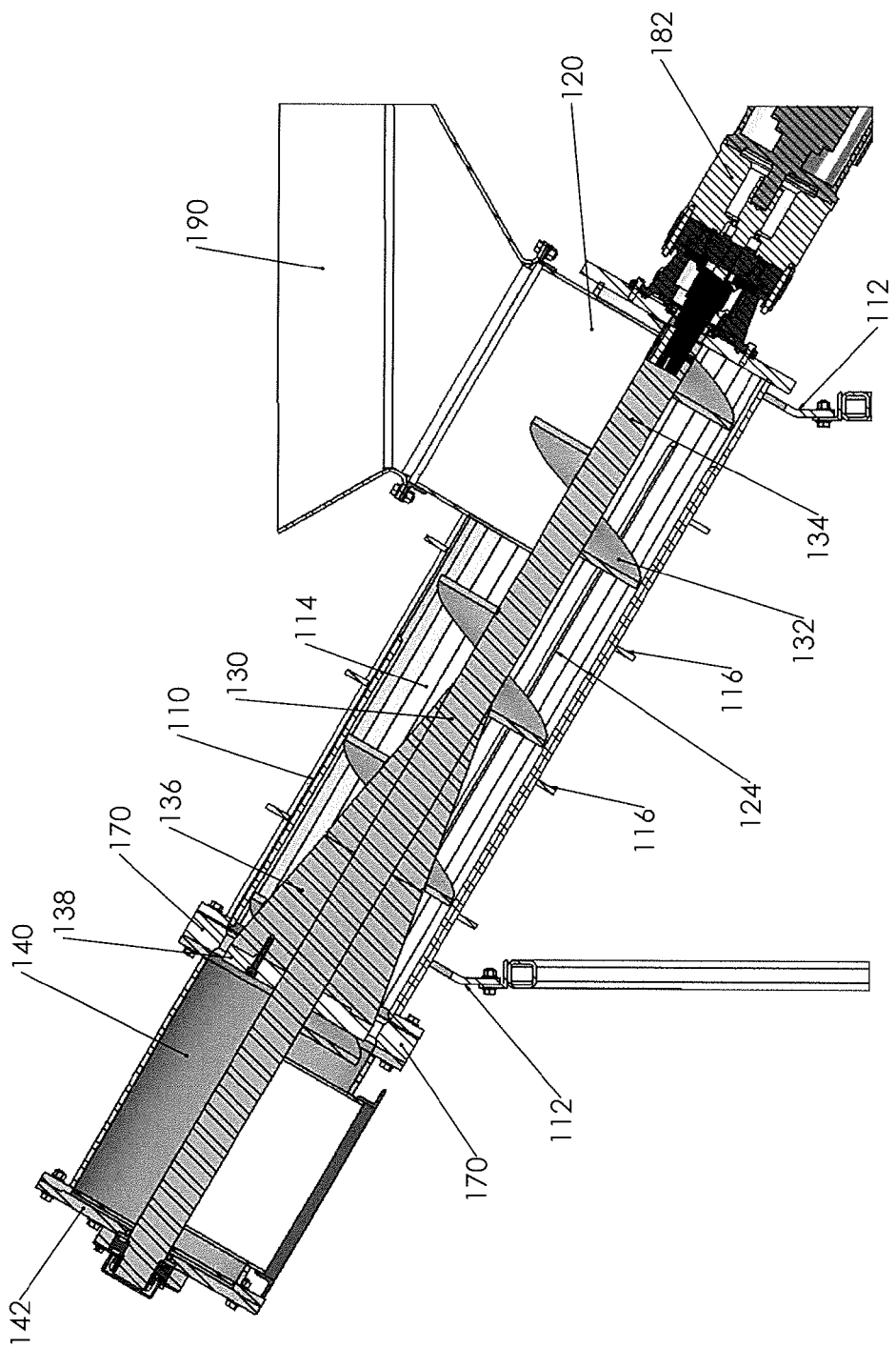
FIG. 7 is a cross-sectional view of an exemplary embodiment of a crusher.
Figure 8:
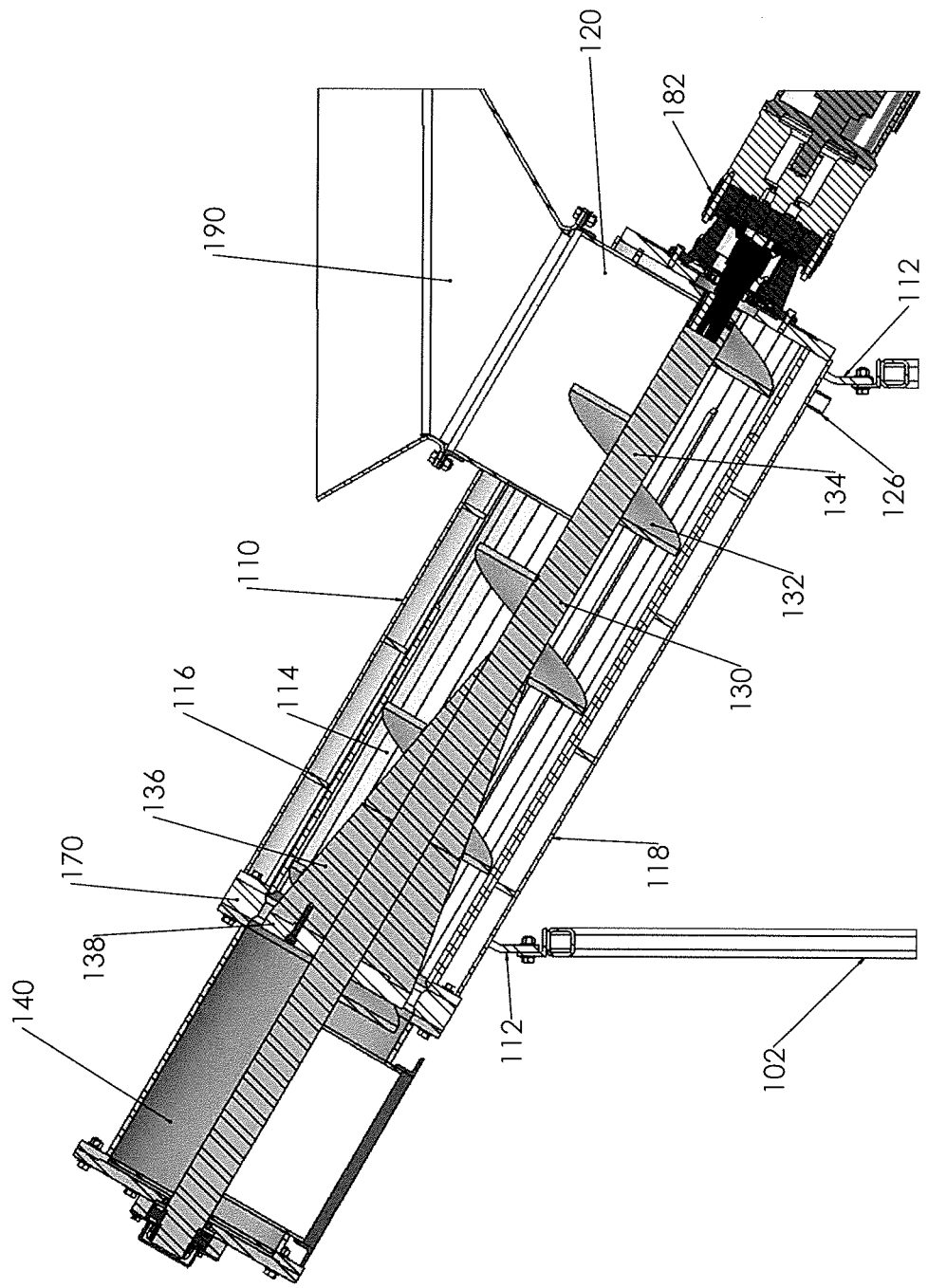
FIG. 8 is a cross-sectional view of an exemplary embodiment of a crusher.
Figure 9:
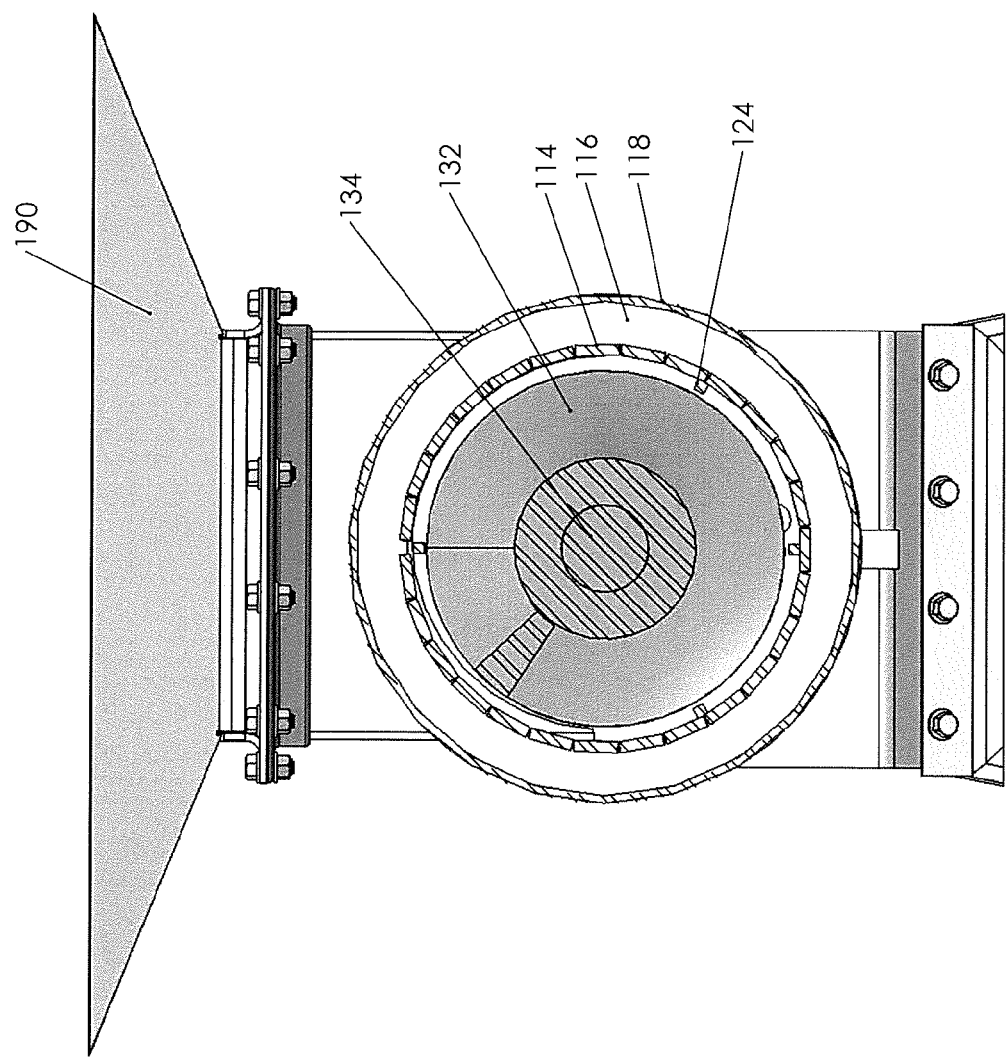
FIG. 9 is an elevated end view of an exemplary embodiment of a crusher.
Figure 10A:
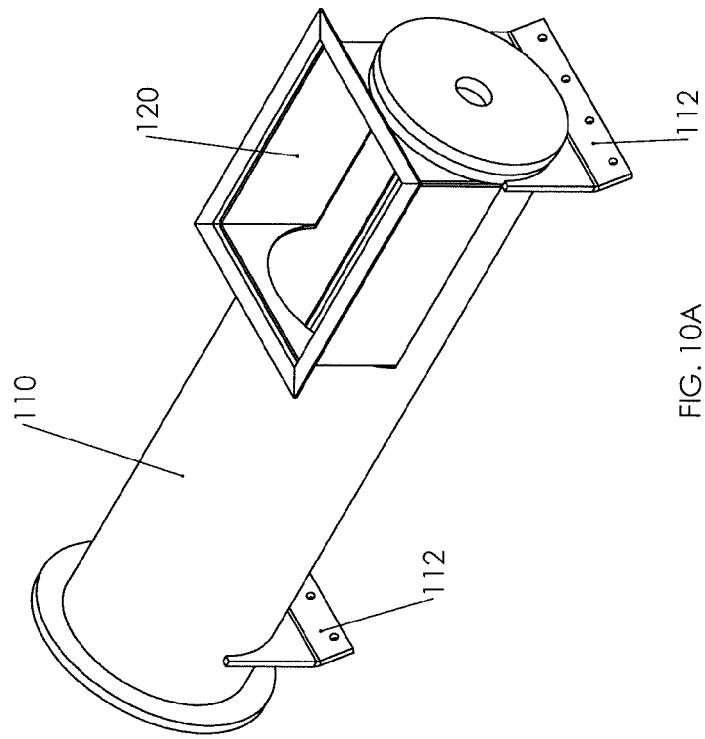
FIGS. 10A-10C are views of an exemplary embodiment of a compaction chamber of a crusher.
Figure 10B:
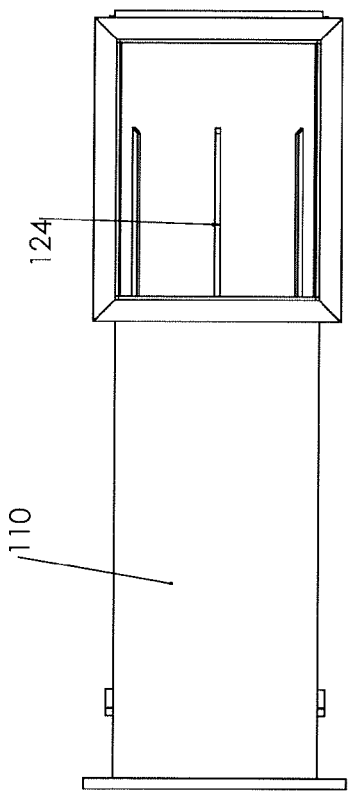
Figure 10C:
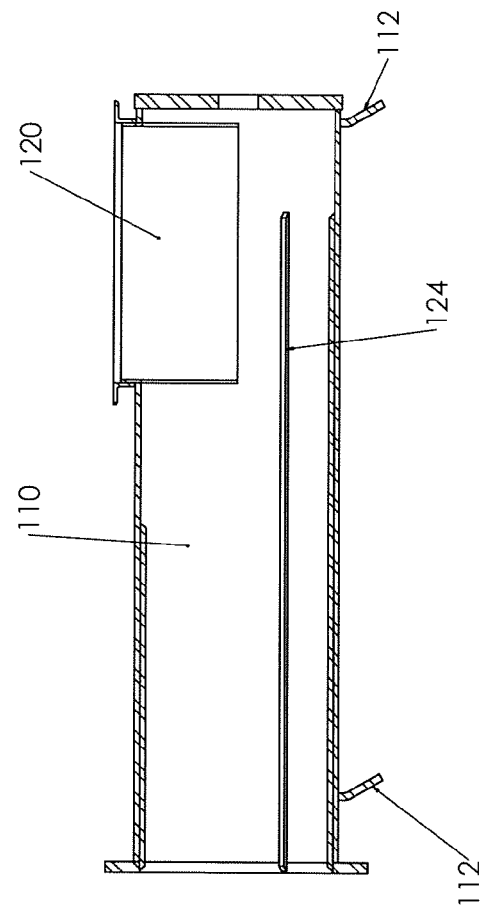

Exemplary embodiments of the crusher 10 may include a compaction chamber 110 that is mounted to the frame 102. The compaction chamber 110 may include one or more mounting bodies 112 that extend from the periphery thereof that facilitate mounting of the compaction chamber 110 with the frame 102. The compaction chamber 110 may be associated with the frame 102 by any number of means. However, in one example, threaded fasteners may facilitate the association. The compaction chamber 110 may be any number of geometries along the length. In exemplary embodiments, the compaction chamber 110 is substantially cylindrical along the length. Also, in some embodiments, as depicted in at least FIGS. 5 and 7, the compaction chamber 110 may include a series of longitudinal members 114 that are secured at desired positions by one or more securing members 116. The series of longitudinal members 114 and securing members 116 may provide a compaction chamber 110 that will remain substantially the same size as the surface of the compaction chamber 110 wears away through the action of the material therein. Some exemplary embodiments of the compaction chamber 110 may include a series of longitudinal members 114 and securing members 116 that are located within a substantially tubular body 118, as depicted in FIGS. 6 and 8. The compaction chamber 110 includes an inlet chamber 120 that is adapted to receive materials. The walls of the compaction chamber 110 may be fabricated from materials that are strong enough to withstand the force exerted by the materials that are compacted or compressed by the screw assembly 130 during use of the crusher 10. One example of the compaction chamber 110 may be substantially cylindrical in geometry, with at least one opening 122 at the distal exit portion of the compaction chamber 110 that allows the compressed or compacted material to exit. In this example, the proximal end of the inlet chamber 120 may allow a screw assembly 130 to pass through the proximal wall, and at least a portion of the top of the inlet chamber 120 may allow material to enter the compaction chamber 110. However, in other embodiments, the inlet chamber 120 may be any number of geometries and positions that allow material to enter the compaction chamber 110. In some examples, the inlet chamber 120 may have multiple openings, such as openings in the top surfaces of the compaction chamber 110, which allow material to enter the compaction chamber 110 for compression and/or compaction (e.g., at generally the same or different points along the length of the compaction chamber 110).

One or more flow bars 124 may be situated within at least a portion of the interior of the compaction chamber 110. The one or more flow bars 124 facilitate the flow of material being compacted within the compaction chamber during use of the crusher by helping push material (in concert with the screw flights) from the inlet chamber 120 to an outlet chamber 140.

The compaction chamber 110 may include one or more drain apertures 126, as depicted in FIG. 8, that facilitate the draining of liquids or other materials from within the compaction chamber 110. In one example, some exemplary embodiments of the crusher 10 may be used to compact or compress full or partially full plastic liquid containers. In this example, during the compaction process liquids contained within the bottles or other containers will empty within the compaction chamber 110. A drain aperture 126 may facilitate the removal of unwanted liquids. Additionally, some exemplary embodiments of the crusher 10 may include drain apertures 126 that facilitate the cleaning or maintenance of the crusher 10.

Exemplary embodiments of the compaction chamber 110 may include wedge wire (not shown) along at least a portion of the interior. The wedge wire may facilitate the compaction and advancement of the materials, along with facilitating the drainage of unwanted liquids from the compacted materials. The wedge wire may be added to or take the place of the longitudinal members 114 and securing member 116 in some exemplary embodiments.

Exemplary embodiments of the compaction chamber 110 house a screw assembly 130 that may be mounted to or otherwise extend generally between the proximal wall and distal wall of the compaction chamber 110. In exemplary embodiments, the screw assembly 130 may be secured to or otherwise in association with the compaction chamber 110 and/or frame by at least one bearing 150. In some embodiments, at least a portion of a bearing housing engages at least a portion of the proximal wall of the compaction chamber 110 that may encircle the opening contained therein to assure that material does not exit the proximal end of the compaction chamber 110. A gasket or similar device may also be placed between the bearing housing and the proximal wall of the inlet chamber 120 to effectuate a seal. In certain exemplary embodiments, at least one bearing 150 may also be contained in a bearing housing that engages the distal wall of an exit portion of the compaction chamber 110. A bearing housing may be any number of geometries depending on the number and types of bearings used. However, in some specific embodiments, the bearing housing is substantially cuboid or cylindrical.

The screw assembly 130 may include one or more flights 132 in exemplary embodiments. Exemplary embodiments of the screw assembly shaft 134 may include a portion 136 that increases in diameter from the proximal to the distal end of the assembly 130. In exemplary embodiments, the portion of increased diameter 136 may be integral with the rest or the shaft 134. However, in some embodiments, the portion of increased diameter 136 may be associated with the shaft 134 by welding or other methods. Exemplary embodiments of the distal end of the screw assembly 130 may include a flattened portion 138 that facilitates the compaction of the materials. The flattened portion 138 may help ensure that the desired thickness of compacted material is produced by the gap between a portion of the compaction chamber 110 and the screw assembly 130.

Exemplary embodiments of the screw assembly 130 may include one or more flights 132 along the length thereof. The flights 132 may be integral with the screw assembly in some embodiments, but may be associated with the screw assembly in any suitable manner in other embodiments. The flights 132 may be any number of geometries and may or may not be continuous along the entire length of the screw assembly 130. The flights 132 may have the same geometry along the entire length of the screw assembly 130 or may change geometry along the length. In one example, the geometry of the flights 132 may be substantially the same along the length of the screw assembly, except along the portion 136 that increases in diameter. For example, along the portion 136 that increases in diameter, the flight geometry may stay the same, except that the lower portion of the flight is theoretically removed to compensate for the increased diameter of the shaft along the length of the screw assembly (i.e., the height of the flight may decrease toward the distal portion of the compaction chamber). In other exemplary embodiments, the height of the flight may remain the same along portion 136, which would necessitate a corresponding increase in the diameter of the compaction chamber 110.

Figure 12C:
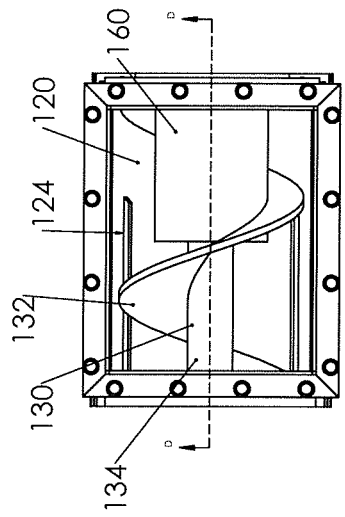
FIGS. 12A-12C are views of an exemplary embodiment that includes a metering bar.
Figure 12B:
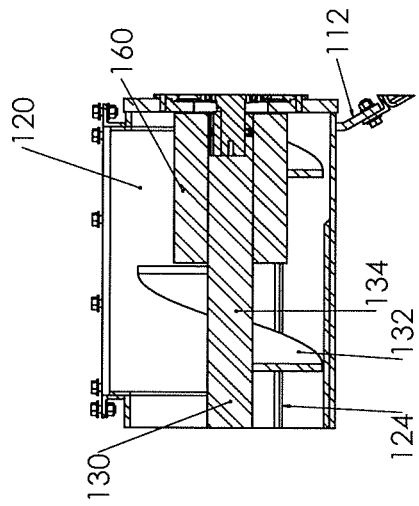
Figure 12A:
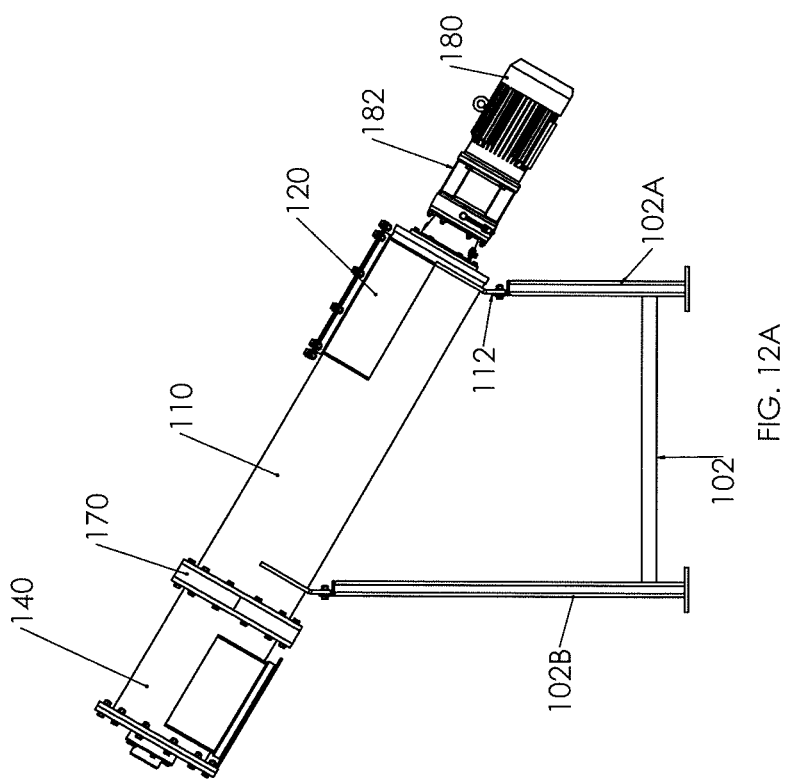

Exemplary embodiments of the screw assembly 130 may include a metering member 160, such as a metering bar or metering tube along at least a portion of the length thereof, as depicted in at least FIGS. 12A-12C. In some embodiments, the metering bar or tube 160 may be integral with at least a portion of the screw assembly 130. However, in other embodiments, the metering bar or tube 160 may be removably attached with at least a portion of the screw assembly 130. In some exemplary embodiments, the metering bar or metering tube 160 may be associated with the proximal end portion of the screw assembly 130. The metering bar or tube 160 may be varying diameters or thicknesses, depending upon the desired size (e.g., thickness) of the material being compacted during use of the compacter. Furthermore, by increasing or decreasing the size of the metering bar or tube, both in terms of length and/or diameter, regulation and metering of the volume of material in the processing chamber may be better controlled.

Exemplary embodiments of the compaction chamber 110 may include an outlet chamber 140 located at the distal end portion thereof that is configured to facilitate the removal of compacted material. The walls of the outlet chamber 140 may be fabricated from materials that are strong enough to withstand the force exerted by the materials that are compacted by the screw assembly 130 during use of the crusher 10. One example of the outlet chamber 140 may be substantially cylindrical in geometry, with at least one opening at the proximal end of the outlet chamber 140 that allow the compressed material to enter. In this example, the proximal end of the outlet chamber 140 may allow a screw assembly 130 to pass through the proximal wall, and the crushed material may enter the outlet chamber 140. However, in other embodiments, the outlet chamber 140 may be any number of geometries that allow suitable reception of the crushed material to occur. In this example, the outlet chamber 140 may have at least one additional opening, such as an opening in the bottom or other suitable surface, which allows compacted material to exit the compaction chamber 110.

In exemplary embodiments, an end cap 142 may be associated with at least a portion of the distal end of the outlet chamber 140. Exemplary embodiments of the end cap 142 may include a void adapted to hold a bearing 150 and/or an end portion of the screw assembly 130 and facilitate the rotational movement of the screw assembly during use. The end cap 142 may be associated with the outlet chamber 140 in any number of techniques, including but not limited to: threaded fasteners, welding, adhesives, etc., that allow desired functionality of the crusher. Furthermore, one or more gaskets or similar devices may be situated between at least a portion of the end cap 142 and the outlet chamber 140 to facilitate a tight seal therebetween. Exemplary embodiments may further include an end body 144 that facilitates securement of the screw assembly 130 within the compaction chamber 110. An example of the end body 144 may house a locknut and lock washer that maintain the bearing 150 and screw assembly 130 within a desired position during use of the crusher 10. A seal 146 and a sleeve 148 may be included in exemplary embodiments. The seal 146 and sleeve 148 may effectuate a desired obstruction of material during use.

Exemplary embodiments of the compaction chamber 110 may include one or more wear members 170 that may decrease the amount of components and downtime needed to effectuate the maintenance of the crusher after wear has occurred. For example, during typical wear of the crusher, friction between the material being compacted and the screw assembly and/or interior wall of the compaction chamber 110 may wear down the screw assembly and/or the interior wall. Wearing down of the screw assembly and/or the interior wall of the compaction chamber 110 may produce an undesired space therebetween that leads to larger than desired final compacted material thicknesses. Therefore, the inclusion of one or more wear members 170 at the critical points along the compaction chamber 110 that see the most friction and wear may provide for improved performance of the crusher 10 and require less time and materials when wear does occur.

The one or more wear members 170 are set at a desired distance from the screw assembly 130 to produce crushed material of a desired thickness. As opposed to known crushers, exemplary embodiments may ensure 100% compaction of material, as other crushers allow non-flattened material to pass through a door, squeeze or clam shell portion of the crusher. Exemplary embodiments do not allow uncrushed material to pass through the opening between the one or more wear members and the screw assembly, guaranteeing that essentially 100% of the material passing through the crusher exits at a desired thickness.

In some exemplary embodiments, the one or more wear members 170 may be situated towards the proximal end of the outlet chamber 140 along the body of the compaction chamber 110. In one exemplary embodiment, the wear members 170 may be mechanically fastened to the outlet chamber 140 and/or compaction chamber 110 such as with the use of one or more threaded fasteners 172 (e.g., bolts) and washers 174. Other suitable mechanical fasters may also be used including, but not limited to, screws, clamps, and clips.

Figure 11:
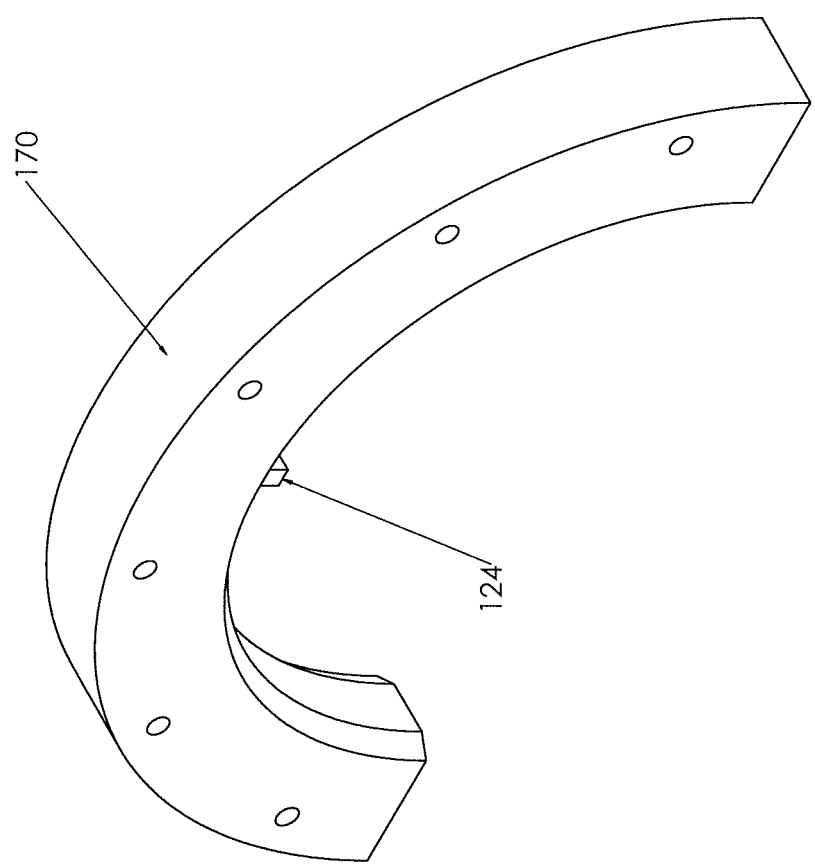
FIG. 11 is a perspective view of a portion of an exemplary embodiment of a wear member.

The one or more wear members 170 may be any number of geometries, depending upon design characteristics and the connection between the outlet chamber 140 and the compaction chamber 110. However, in one example, the wear members 170 are substantially ring-shaped when associated together. Although one ring-shaped wear member may be used, in other exemplary embodiments, any number of partial ring-shaped members may be combined to form a final associated geometry. In some exemplary embodiments, the one or more members may be hingedly attached or attached by another means to effectuate the formation of the final desired associated geometry. In some exemplary embodiments, the wear member 170 may include a portion of a flow bar 124, as depicted in FIG. 11.

Although not shown, exemplary embodiments of the crusher 10 may include an electrical junction box (not shown) that may be mounted on the frame 102. However, the electrical junction box may be positioned at other suitable locations associated with the crusher 10, including other enclosures. The electrical junction box may be in electrical association with and facilitate the operation of components that utilize electricity included in exemplary embodiments of the crusher 10.

Exemplary embodiments of the crusher 10 may include an electric motor 180 to turn the screw assembly 130 that is mounted on the frame 16. In one example, the motor 180 is a dual-voltage three phase TEFC motor that is variable speed. In another example, the motor 180 may be 10 hp that facilitates an exemplary crusher to compact approximately 300-400 lbs of material per hour. Yet another example may include a 3 hp 230 volt single phase drive (capable of producing approximately 1,431 ft/lbs of torque), which may be configured to efficiently process approximately 300-400 lbs per hour of, for example, PET bottles. However, in other exemplary embodiments, other motors may be used that are able to suitably rotate the screw assembly 130, including motors that are operated by power sources other than electricity. However, an electric motor may be preferred because the electric motor may not emit any toxic emissions, unlike other motors that may be used. Also, some exemplary embodiments may not include any hydraulics or other components that may have a tendency to create oily messes.

In some exemplary embodiments, a gearbox or reducer 182 may be in association with the motor 180 to allow a user to vary the rotation speed of the screw assembly 130 during operation of the crusher 10. In one example, a hollow-shaft gearbox or reducer may be used. By including a gearbox or reducer, a smaller motor may be used to provide the required torque to suitably operate the crusher. In exemplary embodiments that include a gearbox or reducer 182, the gearbox or reducer 182 may be used in association with the proximal end of the screw shaft. However, in other embodiments, the motor 180 and/or gearbox 182 may be in association with other portions of the screw assembly 130 to facilitate rotation thereof. In some examples, a variable frequency drive (VFD) (not shown) may be used to control the rotational speed of the screw assembly 130. In some embodiments, a coupler may facilitate the transfer of rotational movement from the motor 180 to the screw assembly 130. In one example, a tapered shaft coupling is used, although other types of couplers may be used in other embodiments. The motor 180 and/or associated gearbox 182 may be situated at either end of the crusher, depending on desired design characteristics, etc.

Some exemplary embodiments of the crusher 10 may include an infeed hopper 190. In exemplary embodiments, at least a portion of the lower surface of the infeed hopper 190 may be mounted to engage at least the upper surface of the compaction chamber 110 by the use of a mounting body that is adapted therefore. In other exemplary embodiments, an infeed hopper 190 may have any suitable association with the compaction chamber 110. Exemplary embodiments of at least a portion of the infeed hopper 190 may be substantially an inverted pyramid in geometry, with at least one opening at the peak end and the base end of the hopper 190. In other embodiments, any number of infeed hopper geometries may be used to facilitate the introduction of material within the compaction chamber 110. In some exemplary embodiments, the infeed hopper 190 may include a cover or similar device (not shown) that may reduce the likelihood of materials flowing back up the hopper during use of the crusher 10.

Exemplary embodiments of the crusher 10 may include an enclosure that covers the motor 180 and/or reducer 182. The enclosure may be mounted to the frame 102 or brackets extending from the frame. Exemplary embodiments of the enclosure may include one or more access panels that allow an individual to access the components contained therewithin. The access panels may be positioned wherever it is desired to access the components within the enclosure.

FIGS. 13-22 show another exemplary embodiment of a crusher. This embodiment of a crusher may include any or all of the aforementioned features of the previously described example of a crusher. This embodiment of a crusher may also include other features to enhance the functionality and versatility of the crusher. In these drawings, certain guards are not shown in order to facilitate description of this example of a crusher.

In this example, crusher 200 is comprised of a compaction chamber 202. The compaction chamber 202 includes an inlet chamber 204 and an outlet chamber 206. The outlet chamber 206 may include an opening 208 that allows for crushed material to exit the crusher. Such as in the previous embodiment, crusher 200 may include a screw assembly 210. An interior face of the compaction chamber 202 may also include at least one flow bar 212 that may be straight or spiraled as previously described to facilitate advancement of the material in the compaction chamber 200. In addition, crusher 200 may include at least one wear member 214 (i.e., a restrictor section) that may facilitate crushing of the material.

This embodiment of crusher 200 may include a conveyor 220. Conveyor 220 may assist with providing a more regulated input of material to the inlet chamber 204. Improved regulation of the input may facilitate smoother operation of crusher 200, such as by preventing or reducing jams at the input to the compaction chamber 202. Also, improved regulation of the input may allow for an easier and more timely transition from crushing one type of material (e.g., plastic bottles) to another type of material (e.g., metal cans). In this example, it is particularly beneficial for the conveyor 220 to be integral with the compaction chamber 202. However, in other examples, a conveyor may not be integral with a compaction chamber so long as the conveyor is sufficiently able to introduce material.

In this exemplary embodiment, compaction chamber 202 and conveyor 220 are in-line with each other and upwardly inclined such that the conveyor 220 and screw assembly 210 are adapted to advance the material in an upward direction. In such an embodiment, the proximal portion of the compaction chamber 202 is situated below the distal portion of the compaction chamber 202. This configuration may offer multiple advantages including, but not limited to: improved drainage of liquid; use of gravity to further facilitate regulation of the input to the inlet chamber 204; a lower, more accessible input point for the feed to the crusher; and efficient use of space. However, while an upward inclination of the crusher may offer particular advantages, other exemplary embodiments of a crusher may utilize other configurations such as substantially horizontal configurations and downwardly sloped configurations.

Figure 16:
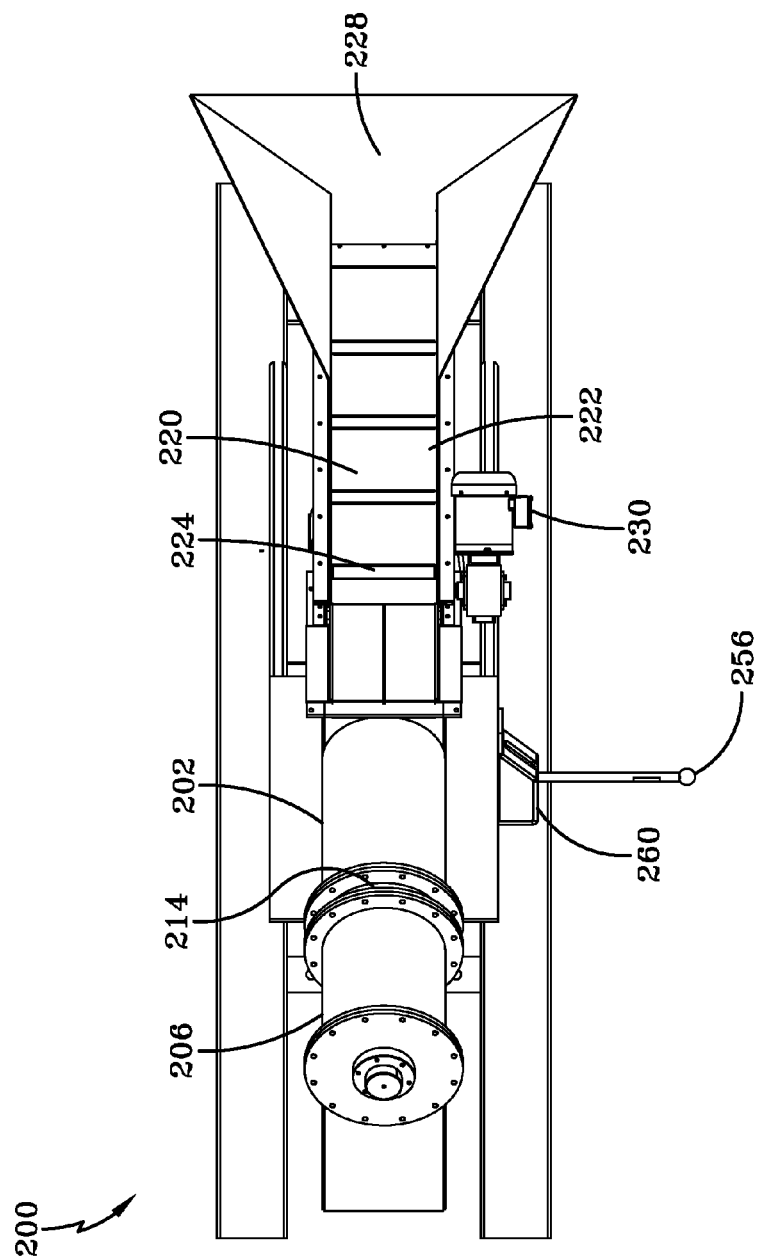
FIG. 16 is a top plan view of the crusher of FIG. 13.

In an exemplary embodiment, conveyor 220 may comprise a belt 222. In one example, a belt may be cleated or ribbed. Such as shown in the example of FIG. 16, belt 222 may include at least one cleat 224, which may assist with advancing the input feed up the incline.

An exemplary embodiment of conveyor 220 may also include an enclosure or at least one guard wall. In this example, conveyor 220 includes a guard wall 226 that extends about the belt 222. Guard wall 226 may assist with keeping the input feed on the belt 222 until it is released to the compaction chamber 202. Guard wall 226 may also shield moving parts. In this example, guard wall 226 is open at the top to allow a user to look down at the belt 222 and check its operation. However, in other exemplary embodiments, the top may be partially or substantially covered. An input hopper 228 may also be provided. In this example, input hopper 228 is associated with guard wall 226. However, embodiments that do not include a guard wall or other enclosure may also include an input hopper. As previously mentioned, the embodiment shown in FIGS. 13-22 allows for a lower position of the input hopper 228, which may facilitate entry of the input feed.

To further assist with regulation of the input feed to the compaction chamber 202, an exemplary embodiment of conveyor 220 may be adjustable or variable speed. In this example, conveyor 220 is associated with an adjustable or variable speed drive 230. As a result, the speed of the conveyor 220 may be adjusted to suit the particular input material (e.g., plastic bottles, metal cans, etc.). An example of an adjustable or variable speed drive 230 may be an electric motor. An electric motor may be preferred because an electric motor may not emit any toxic emissions, unlike other motors that may be used (e.g., motors that are operated by power sources other than electricity). Some exemplary embodiments may not include any hydraulics or other components that may have a tendency to create oily messes. In addition to an adjustable or variable speed drive 230 for conveyor 220, a screw assembly 210 may be associated with an adjustable or variable speed drive 240. Examples of an adjustable or variable speed drive 240 are described above with respect to the previous example. Such an embodiment may enable the conveyor 220 to operate at a different and independently adjustable or variable speed than the screw assembly 210, which may allow for optimal operation of each phase of crusher 200 with respect to the particular type of input feed.

An example of a crusher may include other beneficial features. While conveyor 220 may help to prevent or limit material jams by regulating the input feed, an exemplary embodiment of compaction chamber 202 may include a door assembly 250 that may facilitate clearance of jams within compaction chamber 202. In this embodiment, the door assembly is located on an underside of the bottom, proximal portion of compaction chamber 202. While this location is particularly useful, a door assembly may be situated at another portion of compaction chamber 202 in other exemplary embodiments. There may also be more than one door assembly to allow for the clearance of jams within the compaction chamber 202.

Figure 14:
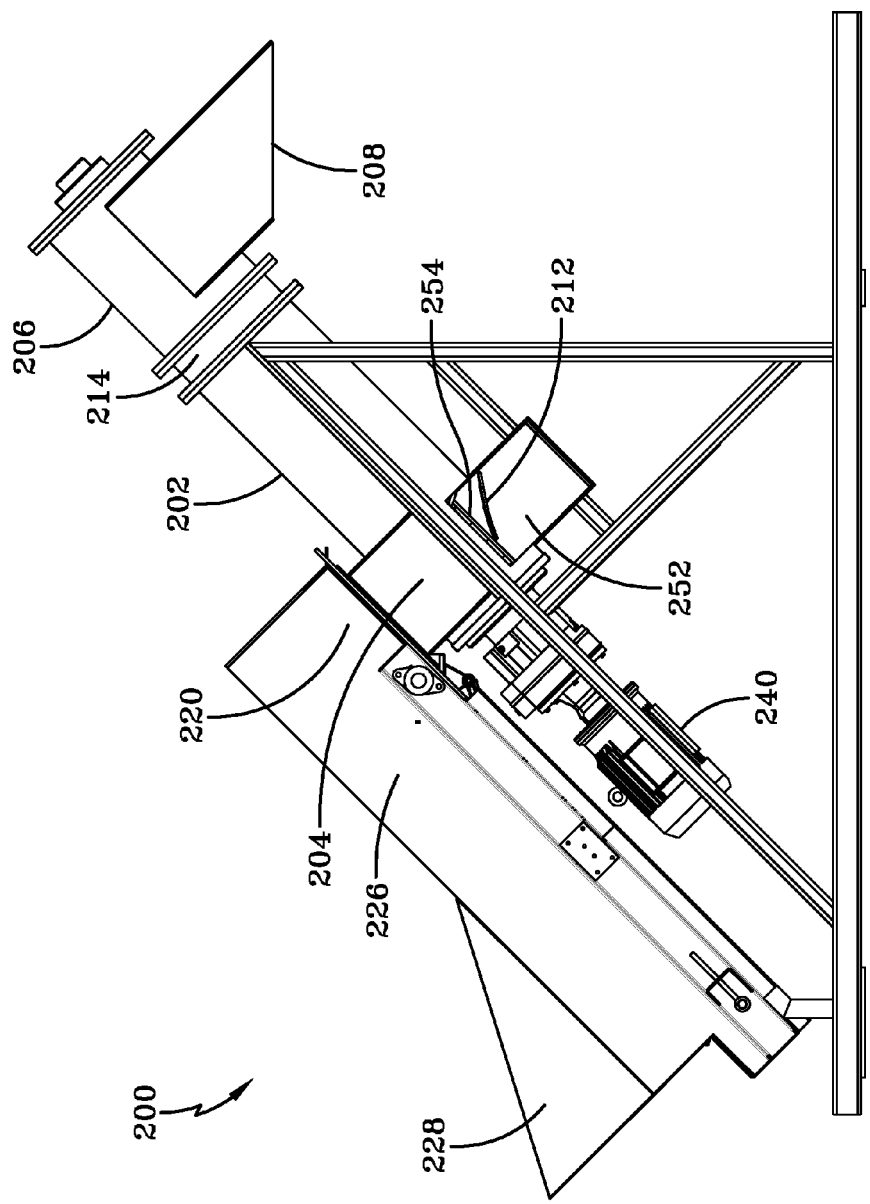
FIG. 14 is a side elevation view of the crusher of FIG. 13 with the jam release door in an open position.
Figure 15:
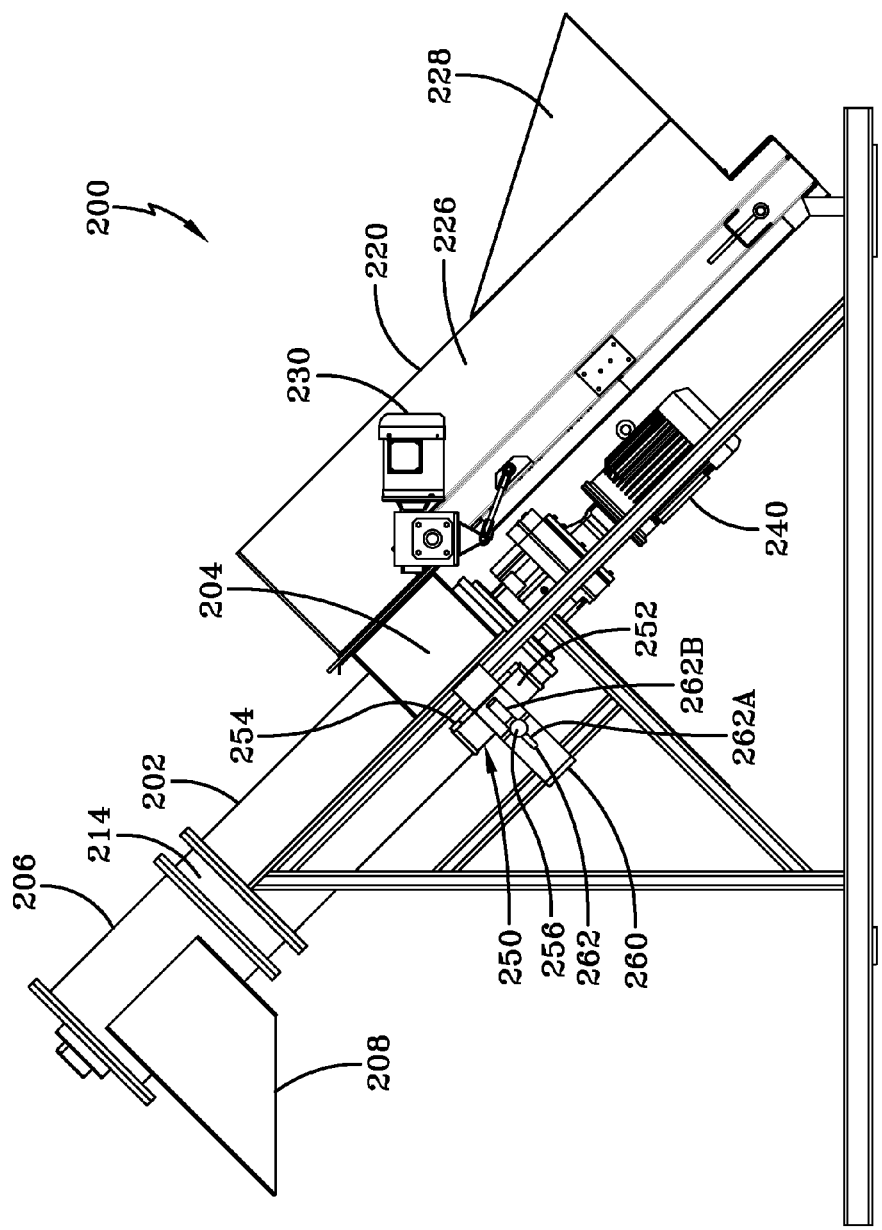
FIG. 15 is another side elevation of the crusher of FIG. 13 with the jam release door in a closed position.
Figure 19:
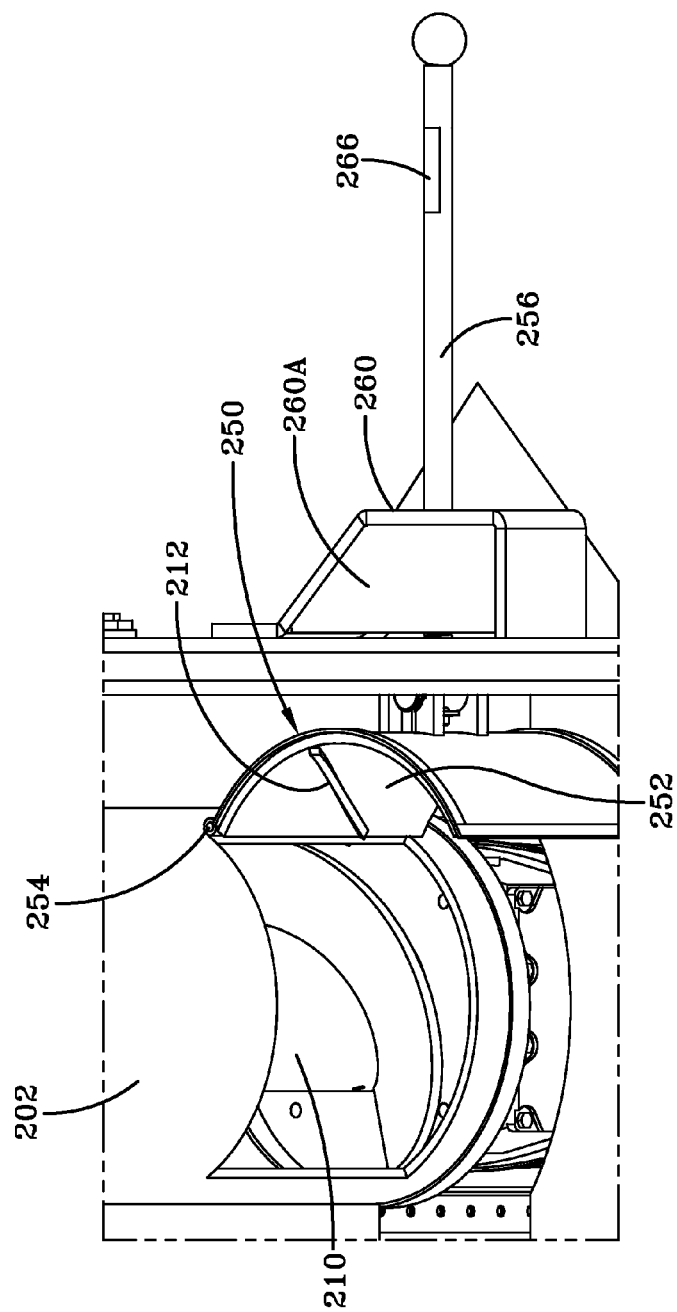
FIG. 19 is a partial side elevation view of the crusher of FIG. 13 with the jam release door in an open position.
Figure 20:
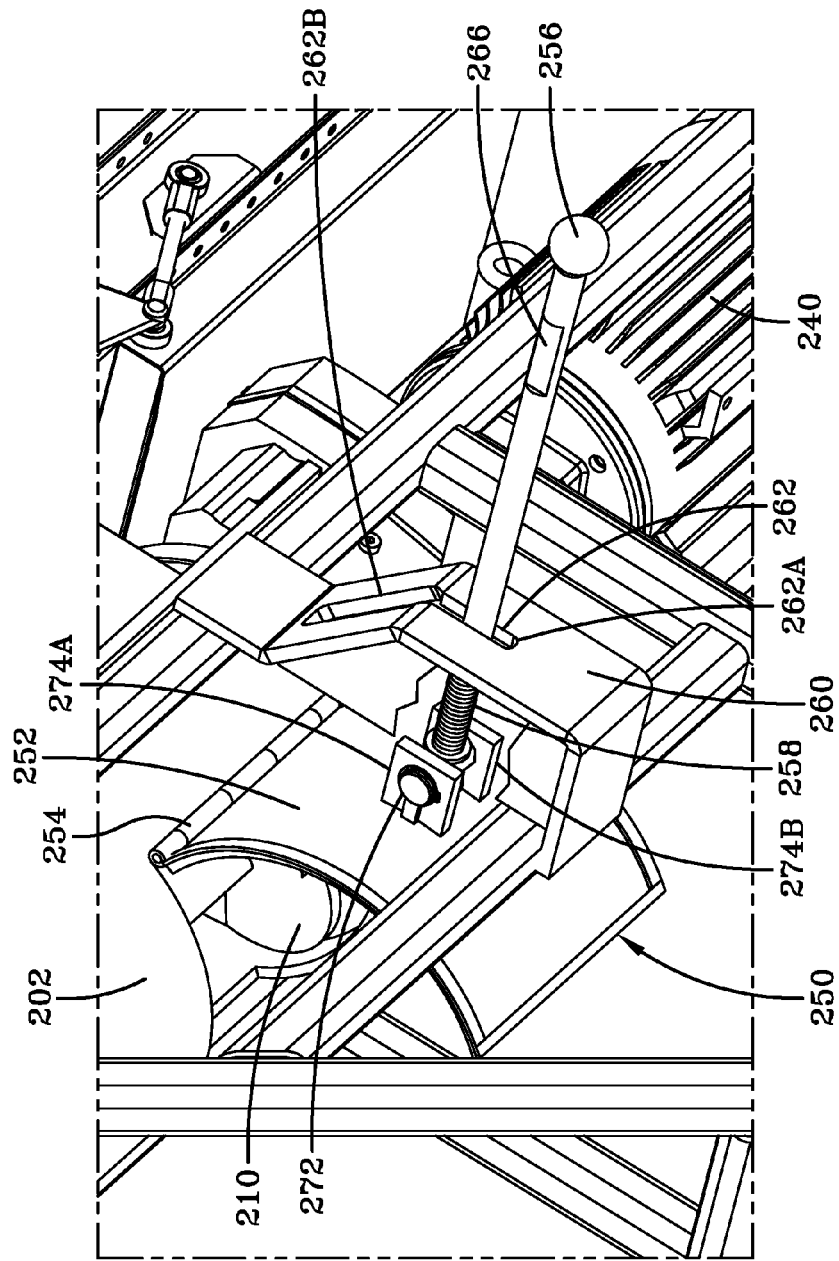
FIG. 20 is a perspective view of the crusher of FIG. 13 with the jam release door in an open position.

In this exemplary embodiment, door assembly 250 is comprised of a door 252. FIGS. 13, 15, 17, and 18 show examples with the door 252 in a closed position, whereas FIGS. 14, 19, and 20 show examples with the door 252 in an open position. By providing a door 252 that is configured to be openable, an exemplary embodiment may facilitate clearance of jams. An example of the door assembly 250 may include a hinge 254 to enable the door to rotate open. While this embodiment is particularly useful, a door in other exemplary embodiments may open in any other suitable fashion including, but not limited to, by sliding.

An exemplary embodiment of door assembly 250 may also include a handle assembly to allow a user to open door 252. In this example, a bar 256 is associated with door 252 for manipulating and controlling the position of door 252. This example of bar 256 includes a spring 258 that facilitates movement of bar 256 between the open and closed positions.

Figure 17:
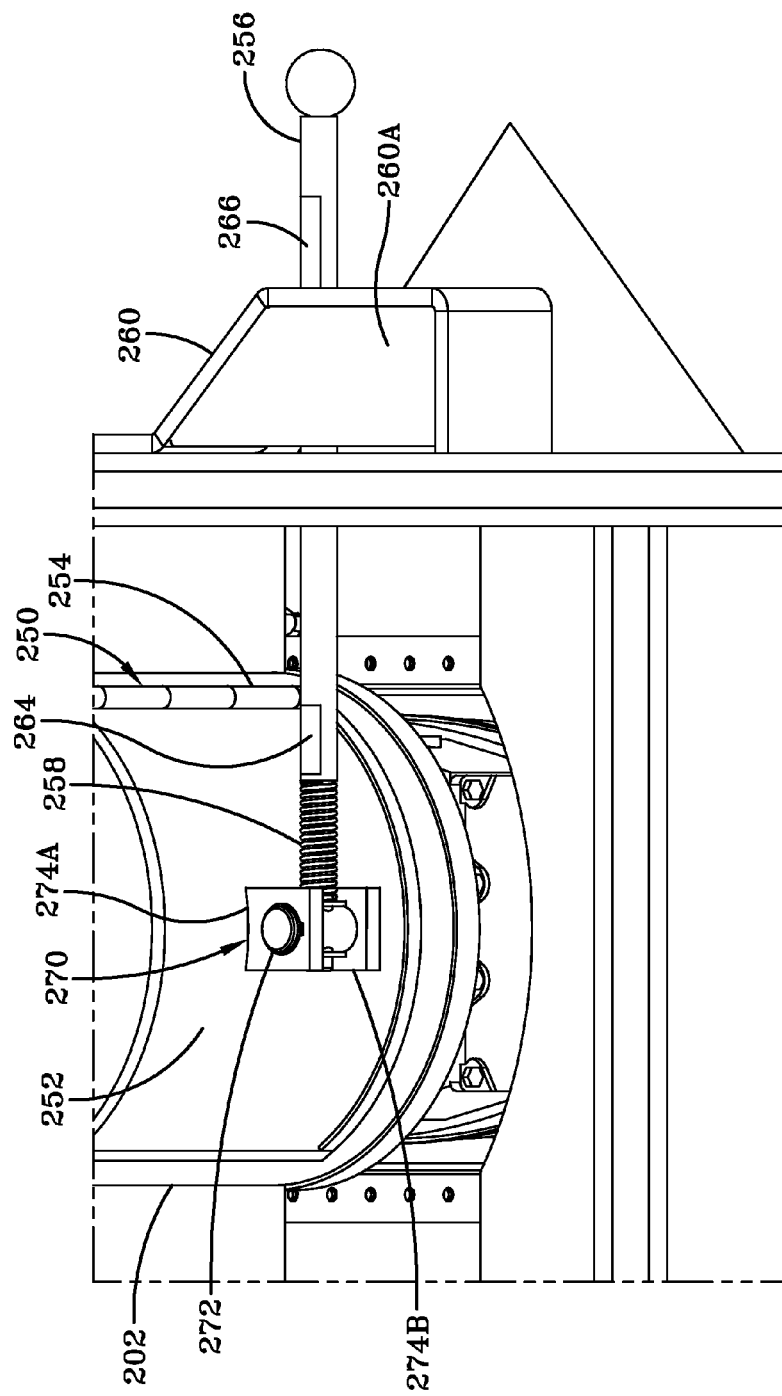
FIG. 17 is a partial side elevation view of the crusher of FIG. 13 with the jam release door in a closed position.
Figure 18:
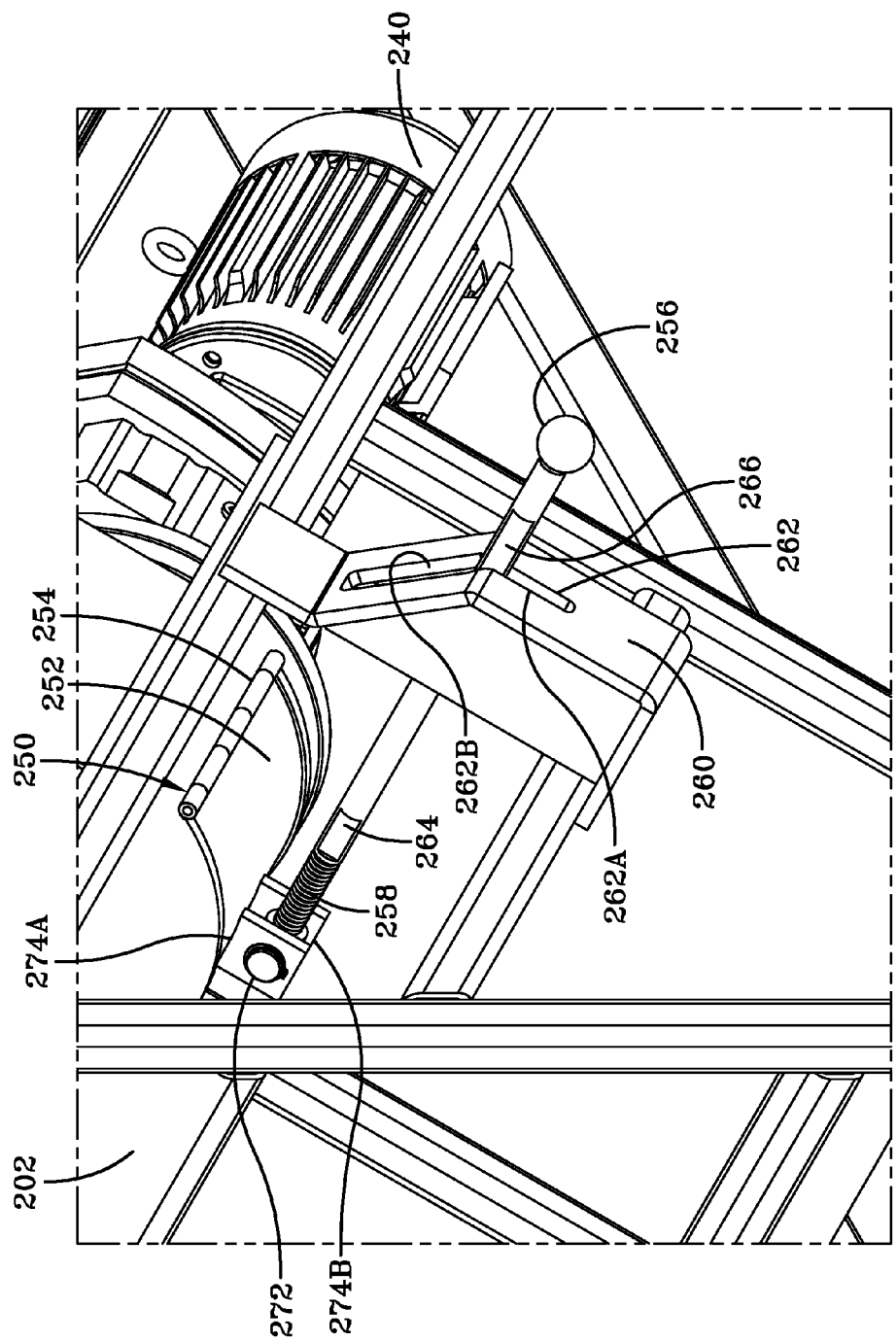
FIG. 18 is a partial perspective view of the crusher of FIG. 13 with the jam release door in a closed position.

An example of door assembly 250 may also include a bracket 260 that is associated with bar 256. An example of bracket 260 may include a side cover 260A such as shown in FIGS. 17 and 19. A side cover is not shown in the other figures for clarity, but other embodiments may not include a side cover. In this exemplary embodiment, bracket 260 comprises a slot 262 that is adapted to engage bar 256. In this embodiment, slot 262 includes a first portion 262A that is narrower than a second portion 262B. First portion 262A is adapted to engage a first notch 264 in bar 256 to releasably lock the door 252 in an open position such as seen in FIGS. 14, 19, and 20, and first portion 262A is adapted to engage a second notch 266 in bar 256 to releasably lock the door 252 in a closed position such as seen in FIGS. 13, 15, 17, and 18. Second portion 262B is adapted to allow bar 256 to be manipulated between the open and closed positions. In particular, bar 256 may be moved to the second portion 262B to allow the bar to be adjusted between the open and closed positions. While this configuration is particularly useful, other exemplary embodiments may include different means to adjust a door between open and closed positions.

As the door is adjusted between the open and closed positions in this exemplary embodiment, the bar 256 pivots with respect to door 252. In this example, the pivot 270 is comprised of a pin 272 that is rotatable between a first holder 274A and a second holder 274B. One example of pin 272 may be a cotter pin. In other exemplary embodiments, different pivots may be used. Moreover, other means (not limited to pivots) for associating a handle with a door may be used in other exemplary embodiments.

As shown in the example of FIGS. 14 and 19, door 252 may include at least a portion of a flow bar. In particular, an interior face of door 252 includes a portion of a flow bar 212 in this exemplary embodiment. However, in other exemplary embodiments, a door may not include a flow bar.

Figure 21:
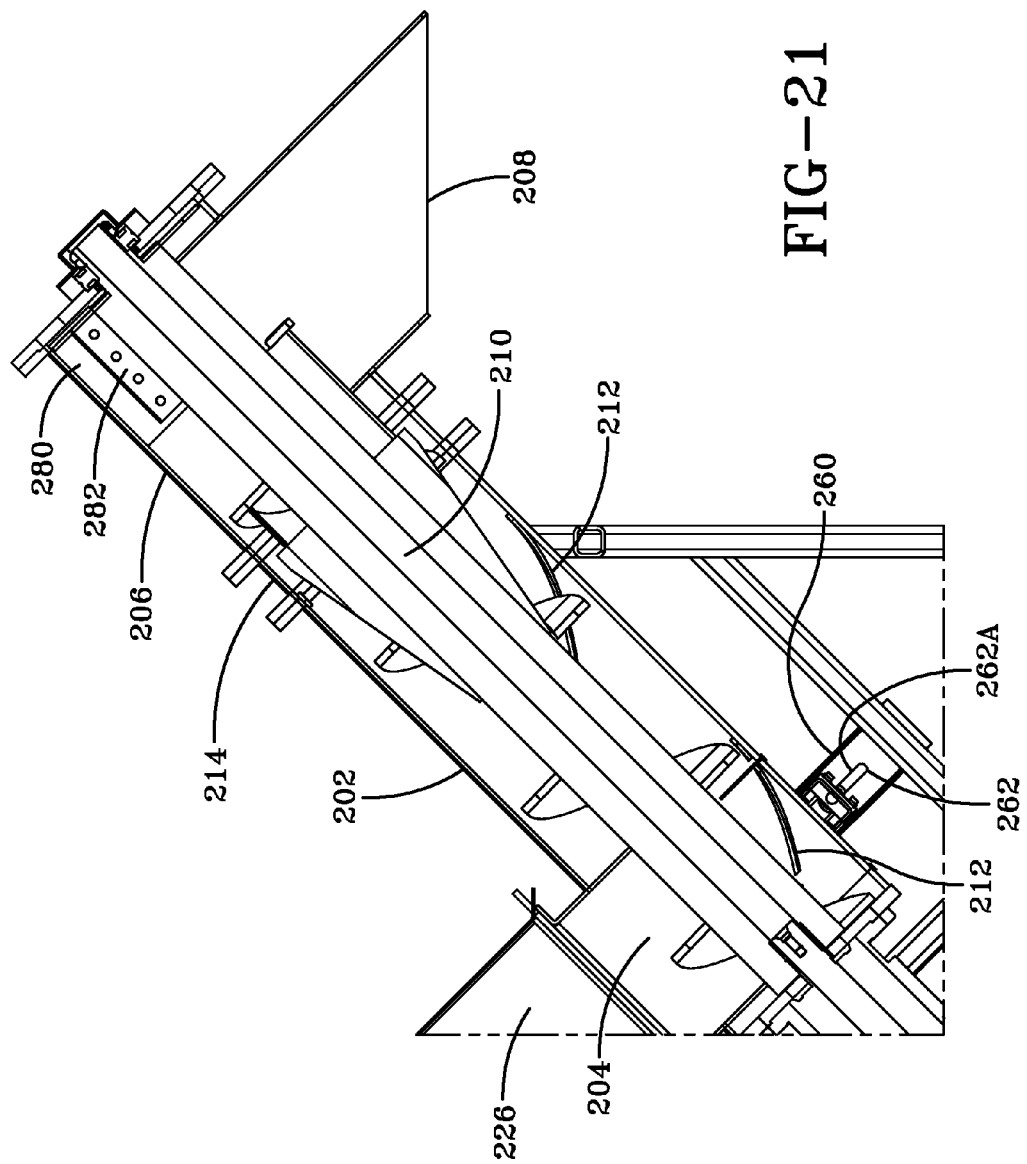
FIG. 21 is a partial cross-sectional view of the crusher of FIG. 13.

An example of a crusher 200 may also include means at the distal portion of the compaction chamber 202 to facilitate discharge of the crushed material. In one exemplary embodiment, a crusher 200 may comprise a wiper adapted to move adjacent to an interior face of the outlet chamber 206 of the compaction chamber 202 to facilitate discharge of the material from the compaction chamber 202, thereby preventing or limiting material from jamming at the end of the compaction chamber 202. FIGS. 21 and 22 show an exemplary embodiment of a wiper 280 that is configured to make rotational contact with the interior face of the outlet chamber 206. In this example, wiper 280 may be comprised of rubber, which may allow for sustained desired contact with an interior face of the outlet chamber 206 with limited wear on the outer chamber 206. In other exemplary embodiments, wiper 280 may be comprised of another suitable material such as plastic or metal, particularly, but not limited to, when the wiper 280 is not adapted to make rotating contact with an interior face of the outlet chamber 206.

In this exemplary embodiment, wiper 280 is connected to a distal portion of the screw assembly 210 such that the wiper 280 is adapted to rotate in association with the screw assembly 210. In particular, wiper 280 is connected to the shaft of the screw assembly 210 by a wiper bar 282 in this exemplary embodiment. At least one mechanical faster 284 (e.g., screws, bolts, pins, glue, adhesives, etc.) may be used to connect wiper 280 to wiper bar 282. In other exemplary embodiments, a wiper may be associated with a screw assembly in any other suitable manner. Moreover, in some exemplary embodiments, a wiper may be adapted to operate independently from a screw assembly. For example, a wiper may be powered by another source.

Exemplary embodiments of crushers are described herein. In particular, various means are described herein to improve the functionality and operability of crushers. Nonetheless, some features may also be useful with other screw and auger systems that are not limited to crushers.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A system for crushing a material, comprising:
   an upwardly inclined conveyor adapted to receive and advance the material in an upward direction;
   an upwardly inclined compaction chamber including an inlet chamber at a proximal portion configured to receive the material from the conveyor and an outlet chamber at a distal portion located above the proximal portion, configured to allow crushed material to exit, the compaction chamber further comprising a door assembly comprising a door that is configured to be openable to allow for clearance of material jams within the compaction chamber;
   a hinge to facilitate opening of the door;
   a spring loaded bar pivotally associated with the door such that the bar is adapted to be manipulated to control opening of the door the bar comprising a first notch and a second notch;
   a bracket comprising a slot such that the slot is adapted to engage the first notch of the bar to lock the door in an open position and engage the second notch of the bar to lock the door in a closed position; and
   a screw assembly comprising a shaft in alignment with the conveyor that generally extends between the proximal and distal portions of the compaction chamber such that the screw assembly is configured to facilitate crushing of the material.

2. The system of claim 1 wherein the conveyor comprises a cleated belt.

3. The system of claim 1 wherein:
   the conveyor is associated with a first drive selected from the group consisting of adjustable speed drives and variable speed drives; and
   the screw assembly is associated with a second drive selected from the group consisting of adjustable speed drives and variable speed drives;
   such that the conveyor is capable of operating at a different speed than the screw assembly.

4. The system of claim 1 wherein the system is configured to crush the material between the compaction chamber and the screw assembly.

5. A system for crushing a material, comprising:
   a compaction chamber including an inlet chamber at a proximal portion configured to receive the material and an outlet chamber at a distal portion configured to allow crushed material to exit, the compaction chamber further comprising a door assembly comprising a door that is configured to be openable to allow for clearance of material jams within the compaction chamber;
   a hinge to facilitate opening of the door;
   a spring loaded bar pivotally associated with the door such that the bar is adapted to be manipulated to control opening of the door, the bar comprising a first notch and a second notch;
   a bracket comprising a slot such that the slot is adapted to engage the first notch of the bar to lock the door in an open position and engage the second notch of the bar to lock the door in a closed position; and
   a screw assembly comprising a shaft that generally extends between the proximal and distal portions of the compaction chamber such that the screw assembly is configured to facilitate crushing of the material;
   wherein the system is configured to crush the material between the compaction chamber and the screw assembly.

6. The system of claim 5 wherein the door is situated on an underside of the proximal portion of the compaction chamber.

7. A system for crushing a material, comprising:
   a compaction chamber including an inlet chamber at a proximal portion configured to receive the material and an outlet chamber at a distal portion configured to allow crushed material to exit, the compaction chamber further comprising a door assembly comprising a door that is configured to be openable to allow for clearance of material jams within the compaction chamber;
   a screw assembly comprising a shaft that generally extends between the proximal and distal portions of the compaction chamber such that the screw assembly is configured to facilitate crushing of the material;
   a hinge to facilitate opening of the door;
   a spring loaded bar pivotally associated with the door such that the bar is adapted to be manipulated to control opening of the door, the bar comprising a first notch and a second notch; and
   a bracket comprising a slot such that the slot is adapted to engage the first notch of the bar to lock the door in an open position and engage the second notch of the bar to lock the door in a closed position.

8. The system of claim 5 further comprising at least one flow bar situated on at least a portion of an interior face of the compaction chamber to facilitate flow of the material;
   wherein the door includes a portion of the at least one flow bar.

9. A system for crushing a material, comprising:
   a compaction chamber including an inlet chamber at a proximal portion configured to receive the material and an outlet chamber at a distal portion configured to allow crushed material to exit, the compaction chamber further comprising a door assembly comprising a door that is configured to be openable to allow for clearance of material jams within the compaction chamber;
   a hinge to facilitate opening of the door;
   a spring loaded bar pivotally associated with the door such that the bar is adapted to be manipulated to control opening of the door, the bar comprising a first notch and a second notch;
   a bracket comprising a slot such that the slot is adapted to engage the first notch of the bar to lock the door in an open position and engage the second notch of the bar to lock the door in a closed position;
   a screw assembly comprising a shaft that generally extends between the proximal and distal portions of the compaction chamber such that the screw assembly is configured to facilitate crushing of the material; and
   a wiper adapted to move adjacent to an interior face of the outlet chamber of the compaction chamber to facilitate discharge of the material from the compaction chamber.

10. The system of claim 9 wherein the wiper is connected to a distal portion of the screw assembly such that the wiper is adapted to rotate in association with the screw assembly.

11. The system of claim 10 wherein the wiper is connected to the shaft of the screw assembly.

12. The system of claim 9 wherein the wiper is comprised of rubber.

13. The system of claim 9 wherein the wiper is configured to make rotational contact with the interior face of the outlet chamber of the compaction chamber.

14. The system of claim 9 further comprising a wiper bar connected to the shaft of the screw assembly;
   wherein the wiper is connected to the wiper bar by at least one mechanical fastener; and
   wherein the wiper is comprised of a plastic.

15. The system of claim 1, wherein the distal portion of the compaction chamber is located above an input hopper connected to a receiving portion of the conveyor.

16. The system of claim 1, wherein the conveyor is configured with guard walls.

17. The system of claim 7 wherein the door is situated on an underside of the proximal portion of the compaction chamber.

18. The system of claim 7 further comprising at least one flow bar situated on at least a portion of an interior face of the compaction chamber to facilitate flow of the material;
   wherein the door includes a portion of the at least one flow bar.

19. The system of claim 7 wherein the compaction chamber is upwardly inclined such that the material is adapted to be advanced in an upward direction.

20. The system of claim 1 wherein the door is situated on an underside of the proximal portion of the compaction chamber.

21. The system of claim 1 further comprising at least one flow bar situated on at least a portion of an interior face of the compaction chamber to facilitate flow of the material;
   wherein the door includes a portion of the at least one flow bar.

* * * * *